United States Patent [19]

Roeder et al.

[11] 4,103,302

[45] Jul. 25, 1978

[54] VELOCITY AND DRIFT ANGLE TRACKING SYSTEM USING ALTIMETRY SIGNALS

[75] Inventors: Allan W. Roeder, Whitesboro; Richard M. Kimball; Richard F. Koschmeder, both of New Hartford, all of N.Y.

[73] Assignee: General Electric Company, Utica, N.Y.

[21] Appl. No.: 705,881

[22] Filed: Jul. 16, 1976

[51] Int. Cl.² .................. G01S 9/48; H04B 7/04
[52] U.S. Cl. ........................... 343/9; 343/8; 343/100 SA; 343/100 CL; 340/3 R; 343/7.5
[58] Field of Search .......... 343/8, 9 R, 100 SA, 343/100 CL, 7.5; 340/3 R

[56] References Cited

U.S. PATENT DOCUMENTS

| 2,166,991 | 7/1939 | Guanella | 89/41 S |
|---|---|---|---|
| 2,415,095 | 2/1947 | Varian et al. | 343/13 SA |
| 2,789,285 | 4/1957 | Ortusi et al. | 343/100 SA |
| 2,866,373 | 12/1958 | Doyle et al. | 343/8 X |
| 2,967,449 | 1/1961 | Weiss | 343/8 X |
| 3,045,232 | 7/1962 | Mercer et al. | 343/9 |
| 3,066,279 | 11/1962 | Marks | 340/3 R |
| 3,085,204 | 4/1963 | Sletten | 343/100 SA |
| 3,087,158 | 4/1963 | Fisch | 343/100 SA |
| 3,103,009 | 9/1963 | Baker | 343/17.1 |
| 3,147,477 | 9/1964 | Dickey, Jr. | 343/8 |
| 3,193,825 | 7/1965 | Lhermitte | 343/9 |
| 3,701,151 | 10/1972 | Sato et al. | 343/9 |
| 3,838,424 | 9/1974 | Goldfischer | 343/8 |
| 3,991,398 | 11/1976 | Andermo et al. | 340/3 R |
| 3,993,999 | 11/1976 | Hemmi et al. | 343/100 SA |

OTHER PUBLICATIONS

Article "The Correlation Aircraft Navigator, A Vertically Beamed Doppler Radar", by Frank R. Dickey, Jr. - presented at National Conference on Aeronautical Electronics, May, 1958.
Article "Air and Space Navigation System", by Raymond Miller in "Electronics", Dec. 15, 1961, pp. 55-59.
Sales Brochure "Preliminary Description for SAL-ACCOR Electronic Speed Log" - Jungner Instrument (Sweden), 1973.
Article "Pulse Envelope Correlation Air Navigator", by James Salerno, IAS Paper No. 62-150, Jun. 1962.

*Primary Examiner*—Maynard R. Wilbur
*Assistant Examiner*—Lawrence Goodwin

[57] ABSTRACT

A system for determining the magnitude and direction of the relative velocity of two objects wherein a first of the objects, for example an aircraft, transmits a continuous sequence of radar pulses from a broad beam antenna directed toward the second object, e.g., the ground, and a receiver, also mounted on the aircraft, receives the echo returns of the pulses through an antenna which has a pair of phase center locations spaced apart along the axis of the aircraft. The two receiving phase centers are electrically displaceable in directions lateral to the aircraft axis (heading) and are controlled to follow substantially the same ground track. The positions of the phase centers are also "dithered" laterally to enable automatic tracking of aircraft drift angle. Reflected pulses received at the forward and aft phase center locations are non-coherently detected and a computing system performs a time-amplitude comparison of the pulse amplitude values detected at the aft phase center location against the pulse amplitude values detected at the forward phase center location N pulse repetition intervals earlier in time. The relative velocity between the aircraft and the ground is calculated as a function of the pulse repetition frequency.

8 Claims, 14 Drawing Figures

S' = S COS θ

VELOCITY AND DRIFT ANGLE TRACKING SYSTEM USING ALTIMETRY SIGNALS

FIELD OF THE INVENTION

The present invention pertains to a velocity and direction (drift angle) measuring system and, more particularly, to a velocity sensor for determining the magnitude and direction of the relative velocity between two objects by sensing, at a first of the objects, a continuous sequence of wave energy pulses relfected from the second object.

BACKGROUND OF THE INVENTION

A system in common use for detecting the velocity and drift angle of fluid-born vehicles, such as aircraft and ships, is the so-called Doppler navigation system. In such systems for aircraft speed measurement, a very narrow radio frequency beam is projected forward of the aircraft at an angle of perhaps 20° to the vertical. The aircraft then captures an echo return and senses the average Doppler-caused frequency shift to obtain an indication of the rate at which the aircraft is approaching the area causing the echo. A trigonometric function of the effective beam angle is used to convert the indicated rate of closure between the aircraft and the area under observation into the desired horizontal velocity component. By using two beams, drift velocity can also be determined.

In a Doppler system, the beam must be narrow to achieve accuracy. This requires that a highly directional transmitting antenna must be employed, leading to substantial difficulty in making the antenna installation small enough and convenient enough for use in high speed aircraft. Even with a restricted beam width, Doppler systems contain large errors arising from changes in the reflectivity of the surface under observation. Since a beam employed in a Doppler system must have finite width, the speed measurement is actually taken from a relatively large observed area. If the area under observation is a smooth surface, then the amount of energy reflected from the nearer portions of the smooth surface will produce a stronger echo return, at which the angle of incidence is more favorable to a strong echo return than at the more remote portions of the area under observation, in which portions the angle of incidence is less favorable to a strong echo return. On the other hand, when the beam falls on irregular shapes, such as trees in a forest, slight changes in the vertical angle make little difference in the average angle of incidence, and more nearly equal weight will be accorded to the near and far portions of the beam. This difference in reflectivity can introduce a substantial error into a Doppler system and greatly reduces its accuracy. Furthermore, the utility of a Doppler system when used over very smooth surfaces, such as calm water, is greatly diminished, if not totally nullified, due to the lack of ground scatterers capable of reflecting the forward-projected beam in the direction of the aircraft. Furthermore, there are many applications, particularly military, in which the required forward projection of wave energy in advance of the aircraft is highly undesirable.

The applicants' system overcomes the above-mentioned disadvantages of the Doppler system. Instead of projecting a narrow beam forward of the vehicle, the present system requires only a broad beam of pulse energy transmitted substantially directly to the reference surface, i.e., in the case of an aircraft or ship, vertically down to the ground or sea bottom. Operation with a broad beam width enables the use of a very small and compact antenna. Futhermore, because the transmitted power is confined essentially along the vertical, the sensitivity of the system is not affected by the specific characteristics of the reflection surface and the applicants' system is highly effective over smooth water. Still further, since, unlike the Doppler system, applicants' system does not rely on accurate detection of the frequency or phase content of the reflected energy, frequency-altering phenomena in the medium through which the wave energy propagates do not disturb the operation of the system.

A system operating on the same basic principals as that of applicants' is disclosed in U.S. Pat. No. 3,147,477 entitled "Speed Measuring System" issued in Sept. 1964 to F. R. Dickey, Jr. The system disclosed herein is a refined and simplified version of the Dickey system.

OBJECTS AND SUMMARY OF THE INVENTION

It is accordingly an object of the invention to provide an improved velocity and direction (drift angle) sensing system of the type employing transmitted wave energy which is reflected from one object and detected at a second object and analyzed in order to determine the relative velocity and direction between said objects in a plane substantially perpendicular to a line between them.

A further object is to provide in a system of the type described simple and highly accurate means for correlating wave energy echoes detected at the first aforementioned object in order to determine the magnitude and direction of said relative velocity.

Still another object is to eliminate the need in a system of the type described for a continuous wave transmitter and to substantially simplify the apparatus required for eliminating feedthrough from the transmitting portion of the system to the receiving and detecting portions of the system.

Yet another object is to provide an improved system of the type described which is substantially insensitive to variations in the attitude of the vehicle carrying the transmitting and receiving systems.

Yet a further object is to provide an improved system of the type described which is highly adaptable to implementation through use of readily available, highly reliable and low cost circuit elements of the digital processing type.

Still another object is to provide a system of the type described capable of automatically detecting and tracking velocity and direction using a pair of fully elelctrically controlled energy-receiving phase centers.

Additional objects and advantages of the invention will be set forth in part in the description that follows, and in part will be apparent from the description, or may be learned by practice of the invention. The objects and advantages of the invention may be realized and attained by means of the instrumentalities and combinations particularly pointed out in the appended claims.

To achieve the foregoing objects and in accordance with one aspect of the invention, a system is provided for determining the direction of relative motion of two objects in a plane substantially perpendicular to a line between them wherein a transmitter is provided on a first of the objects for illuminating the second object with a substantially continuous train of wave energy pulses. The first object is also provided with energy receiving and detecting means having forward and aft phase center locations spaced apart in the general direction of said relative motion. Additionally, means are provided for displacing the phase center locations in directions lateral to the general direction of motion. Further means are provided for processing selected pairs of pulses received at the two phase center locations to generate a crosscorrelation output for a plurality of selected pairs of pulses. A crosscorrelation difference output is generated by comparing the crosscorrelation outputs for two different sets of lateral phase center locations and the amount of lateral displacement is controlled by a servo loop using the crosscorrelation difference as the error input. The positions of the forward and aft phase centers thus define the direction of relative motion between the objects.

In accordance with another aspect of the invention, additional correlating means are provided so as to develop a correlation output signal which represents the magnitude and direction of the alignment error between the spatial position of an aft phase center location and the spatial position occupied by a forward phase center location N pulse repetition intervals earilier in time. This is done by generating the correlation output signal in accordance with the general algorithm $$, e_{vi} = (F_i - A_{N+i})(F_{i+2} - F_{i-2})$$

where $F_i$ and $A_{N+i}$ represent selected pairs of forward and aft pulses detected at a given set of forward and aft phase center locations and $F_{i-2}$ and $F_{i+2}$ represent the pulses detected at the forward phase center immediately before and after the $F_i$ pulse (the subscript i denoting a progression of odd integers to indicate the chronological occurrence of the pulses). With a system operating in this fashion, a closed loop for continuously tracking the velocity is established by adjusting the repetition frequency of the transmitted pulses so as to minimize $e_{vi}$. Buy combining the operation of the phase center displacement and PRF loops, both direction (drift angle) and velocity are determined and continuously tracked.

These and other objects, features and advantages will be made apparent by the following description of a preferred embodiment of the invention, the description being supplemented by drawing as follows.

DESCRIPTION OF THE PREFERRED EMBODIMENT

Figure 1:
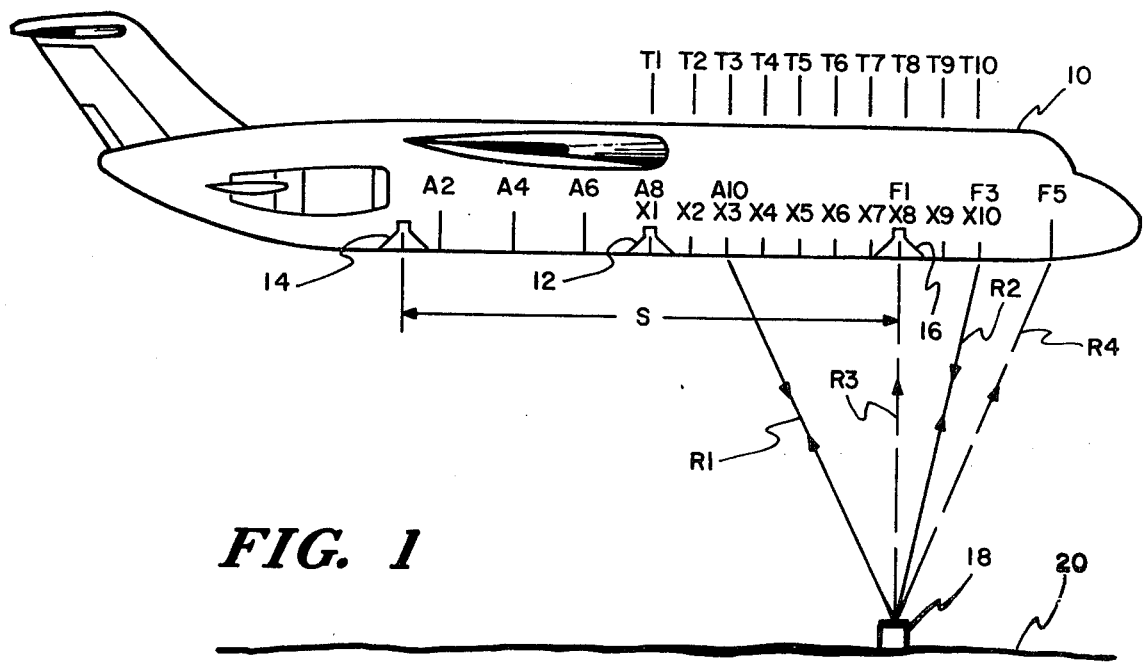
FIG. 1 is a schematic diagram used in connection with a description of the basic principals of the invention, the diagram illustrating the basic geometry of the system and further showing rays which describe certain transmitted and received pulses at particular times during a chronological sequence of events depicted by the graduated time scale T1 through T10.

FIG. 1 schematically depicts the general arrangement of elements in accordance with one embodiment of the invention. It is desired to determine the velocity of aircraft 10 relative to the earth's surface 20. Aircraft 10 has a transmitting antenna 12 and two receiving antennas, a forward antenna 16 and an aft antenna 14. The phase centers of receiving antennas 14 and 16 are spaced apart from one another along the longitudinal axis of the aircraft by a distance S. For purposes of illustration, the transmitting antenna 12 is mounted halfway between the receiving antennas. As will be explained herinafter, it is not necessary that the transmitting antenna be positioned halfway between the receiving antennas, or that it be positioned between the antennas at all.

As set forth in the aforementioned Dickey U.S. Pat. No. 3,147,477, the operation of this type of system depends upon the fact that two identical receiving antennas pointed at the ground and following the same ground track will detect identical echo signals which are offset in time by the interval which it takes the aircraft to move through a predetermined distance determined by the spacing of the phase centers of the receiving antennas. By delaying the signal received at the forward antenna 16 and correlating the delayed signal with that received at the aft antenna 14, the time that it takes the aircraft to travel through the predetermined distance can be determined by adjusting the forward signal time delay until a maximum correlation is detected between the forward and aft signals. The velocity of the aircraft may therefore be computed by calculating the quotient of the predetermined distance and the time delay factor which produced the maximum correlation.

In terms of the arrangement shown in FIG. 1, the signal received by the aft antenna 14 will have its maximum correlation with a previously received forward signal when the aircraft has travelled a sufficient amount to place the aft antenna 14 and the transmitting antenna 12 in exactly the same positions occupied by the transmitting antenna 12 and the forward antenna 16, respectively, at the time the previous signal was received at the forward antenna. Thus, the velocity of the aircraft can be calculated by the formula Velocity = S/2T where T represents the amount of time that it takes to move the antennas 14 and 12 into the same positions previously occupied by the antennas 12 and 16, respectively.

A principal difference between the system described in U.S. Pat. No. 3,147,477 and the system of the present invention is that with the present system the transmitting antenna 12, instead of generating continuous wave energy which constantly illuminates ground surface 20, the transmitting antenna is made to emit a continuous sequence or train of narrow radio frequency pulses. The general operation of the present system can be understood through use of the time scale graduations T1 through T10 shown in FIG. 1. The aircraft is depicted in FIG. 1 at the time T1. The position of transmitting antenna 12 at time T1 is indicated at position X1, which aligns with T1. Similarly, the position of forward antenna 16 is shown at F1.

It is assumed that the transmitting antenna emits a pulse at each of the times T1 through T10. Thus, the antenna emits a pulse for each of the positions denoted as X1 through X10. As will be described in detail hereinafter, the receiving antennas 14 and 16 are operated so that they alternately detect the reflections of the transmitted pulse. Thus, at time T1 an echo pulse is received by the forward antenna when it is in the position shown at F1. However, aft antenna 14 is not operated at T1 and thus no pulse is detected at A1. However at time T2 the transmitted pulse X2, after reflection from the ground, is detected by the aft antenna 14 when it is in the position A2. No pulse is received by forward antenna 16 at T2 because of the aforementioned alternating control of the antennas.

Thus, as shown in FIG. 1, transmitted pulse X3 is reflected by a scatterer 18 on ground surface 20 and is received by forward antenna 16 as a reflected pulse F3. The transmitted pulse follows a path R1 to the scatterer and the reflection thereof follows a path R2 to the forward receiving antenna. Seven pulse repetition intervals later, at time T10, the transmitted pulse X10 is received by aft antenna 12 as a reflected pulse A10. It is noted that at time T10 the transmitting antenna 12 and the aft antenna 14 occupy the same positions in space that the forward antenna 16 and the transmitting antenna, respectively, occupied at time T3. Thus, the transmitted pulse X10 follows path R2 to the same scatterer 18 and is reflected to the aft receiving antenna along the path R1. Since the paths followed by the detected pulses F3 and A10 relative to scatterer 18 are identical, these two echo pulses will be modulated by the scatterer in an identical fashion. This same analysis applies for all of the ground scatterers within the field of view of the antennas and therefore the detected echo pulses F3 and A10, when compared with one another, will exactly match.

In accordance with a basic principle of the present invention, if the pulse repetition interval t between the transmitted pulses X is properly set, each echo pulse received by aft antenna 14 will identically match the echo pulse received by forward antenna 16 Nt seconds earlier in time (N representing an arbitrarily chosen integer which in the example of FIG. 1 is seven). This is because the received echo pulse $A_{N+i}$ will have been reflected from exactly the same group of random scatterers along exactly the same propagation path as the previously received echo pulse $F_i$. If the pulse repetition interval (PRI) is not properly adjusted, the aft antenna will be slightly misaligned at time $T_{N+i}$ with respect to the spatial position occupied by the transmitting antenna at the time $T_i$ with the result that the correlation between a series of forward pulses $F_i$ and the corresponding series of aft pulses $A_{N+i}$ will be less than that which would have been detected in the case where the antenna phase centers were aligned. This is because the ground scatterers are not "viewed" at exactly the same angle and the reflections do not follow exactly the same paths when the phase centers are misaligned. When the phase centers are in a condition of exact alignment, the velocity of the aircraft along the line of antenna phase center separation is a function of the PRI and can be determined by the equation $$V = S/2Nt \qquad (1)$$

A more general way of looking at the situation is to consider the hypothetical case where the forward and aft antennas are each capable of alternately transmitting and receiving pulses. Each antenna thus transmits an identical pulse at the same instant and then detects its own echo return. When the detected returns from the aft antenna exactly match the returns detected at the forward antenna in response to the previously tansmitted pulse, the aircraft has moved through a distance exactly equal to the antenna spacing in the time between pulses. The velocity of the aircraft is therefor $S_e/t$, where $S_e$ represents the spacing between the antennas and t represents the PRI.

Considering the FIG. 1 arrangement, the effective transmit-receive phase center for antenna 14 is half way between antenna 12 and antenna 14. The same is true for the forward antenna. Therefore, the "effective" spacing $S_e$ between the two antennas is $S_e = S/2$ Thus the general expression for velocity equation (1), in terms of "effective" phase center separation, is $$V = S_e/Nt \qquad (2)$$

Figure 2A:
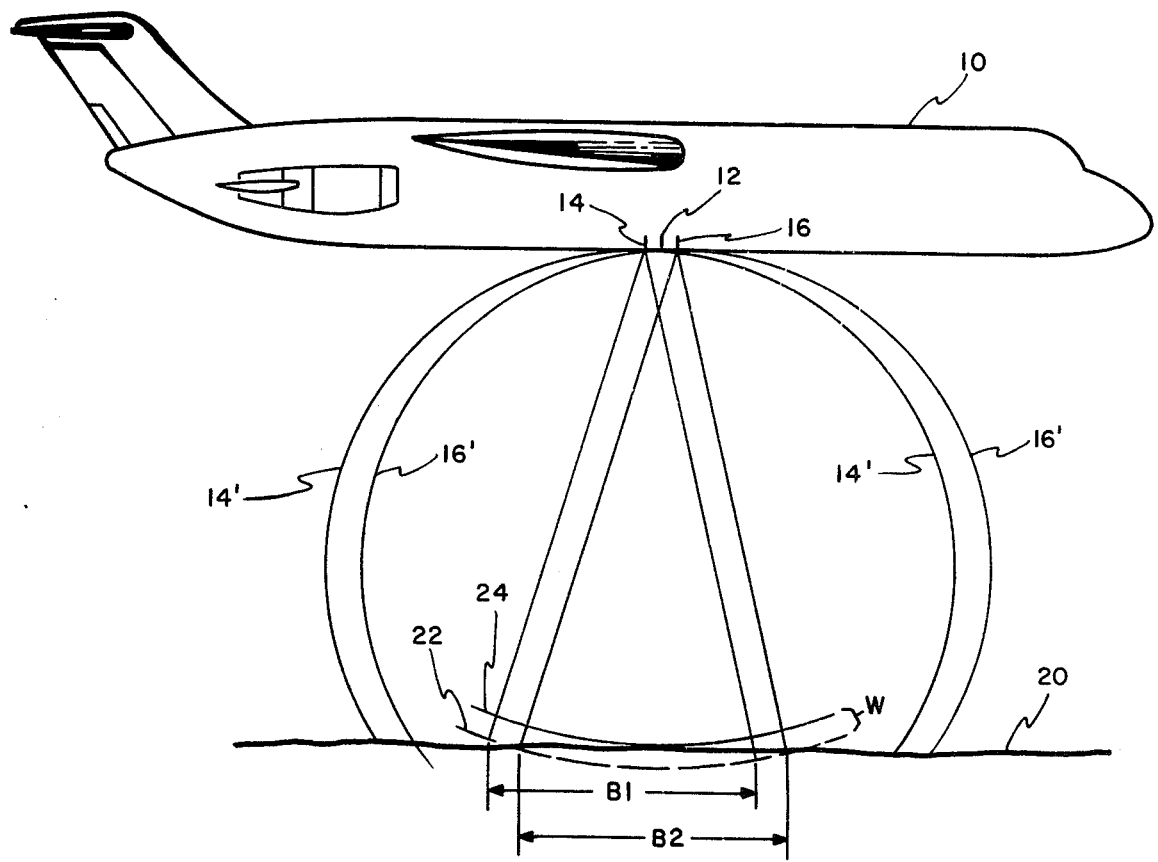
FIG. 2a is a schematic diagram illustrating the broad beam characteristics of the antenna structures utilized with the system of the invention and further shows the overlapping fields of view of the forward and aft energy-receiving phase centers.

FIG. 2a illustrates the various geometrical relationships of the system in a manner which is not as exaggerated as the schematic illustration of FIG. 1. As shown in FIG. 2, the antennas 12, 14 and 16 are actually spaced quite close together and, in fact, are separated only on the order of a few inches in an actual application. Each transmitted pulse has a very narrow duration as illustrated by the distance W between the leading wavefront 22 and the trailing wavefront 24. As will be described in detail hereinafter, the receiving circuits used in connection with the forward and aft antennas are gated so as to actually utilize only the initial portion of the reflected wave energy. As the leading wavefront 22 propagates toward the ground from the transmitting antenna, it will, due to its spherical shape, initially contact the ground at a point exactly beneath antenna 12. This portion of the echo pulse will be "viewed" at the receiving antenna as a dot. However, as the leading wavefront continues to propagate toward the ground the illumination pattern will be seen by the receiving antenna as an expanding circular area. When the leading wavefront has developed to the point where it is illuminating an area on the ground of diameter B1, the trailing wavefront 24 reaches the ground. When this occurs, the pattern of illumination seen at the receiving antenna develops a "hole" in the center and as further time elapses the pattern of illumination assumes the form of an annulus which spreads out in an ever increasing diameter.

Figure 2B:
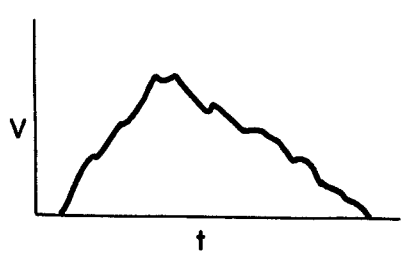
FIG. 2b is a waveform diagram showing the general voltage-time characteristics of a demodulated echo pulse.

As the illumination pattern expands outwardly, the reflected radiation diminishes in strength until the diameter of the pattern exceeds the field of view of the antenna, whereupon no energy is returned to the receiver. The general voltage-time characteristics of each reflected pulse are as illustrated in FIG. 2b. The peak of the echo pulse occurs when the pattern of illumination viewed by the receiving antenna has built up to a solid circle as depicted by the diameter B2 in FIG. 2a. As will be described hereinafter, the detected echo pulse is amplitude-sampled near its peak for purposes of correlation because the signal energy represented by the portion of the signal near the peak represents the reflection from those scatterers within the diameter of FIG. 2a, which scatterers are located relatively close to the vertical.

As further shown in FIG. 2a, the receiving antennas 14 and 16 have relatively broad beam patterns as indicated by the gain curves 14' and 16'. Also, due to the relatively close spacing of the receiving antennas 14 and 16 the fields of view B1 and B2, respectively, of the two antennas overlap to a substantial degree. Therefore, the characteristics of echo pulses received at the two antennas undergo only relatively small changes as the aircraft is displaced through the antenna separation distance.

Figure 3:
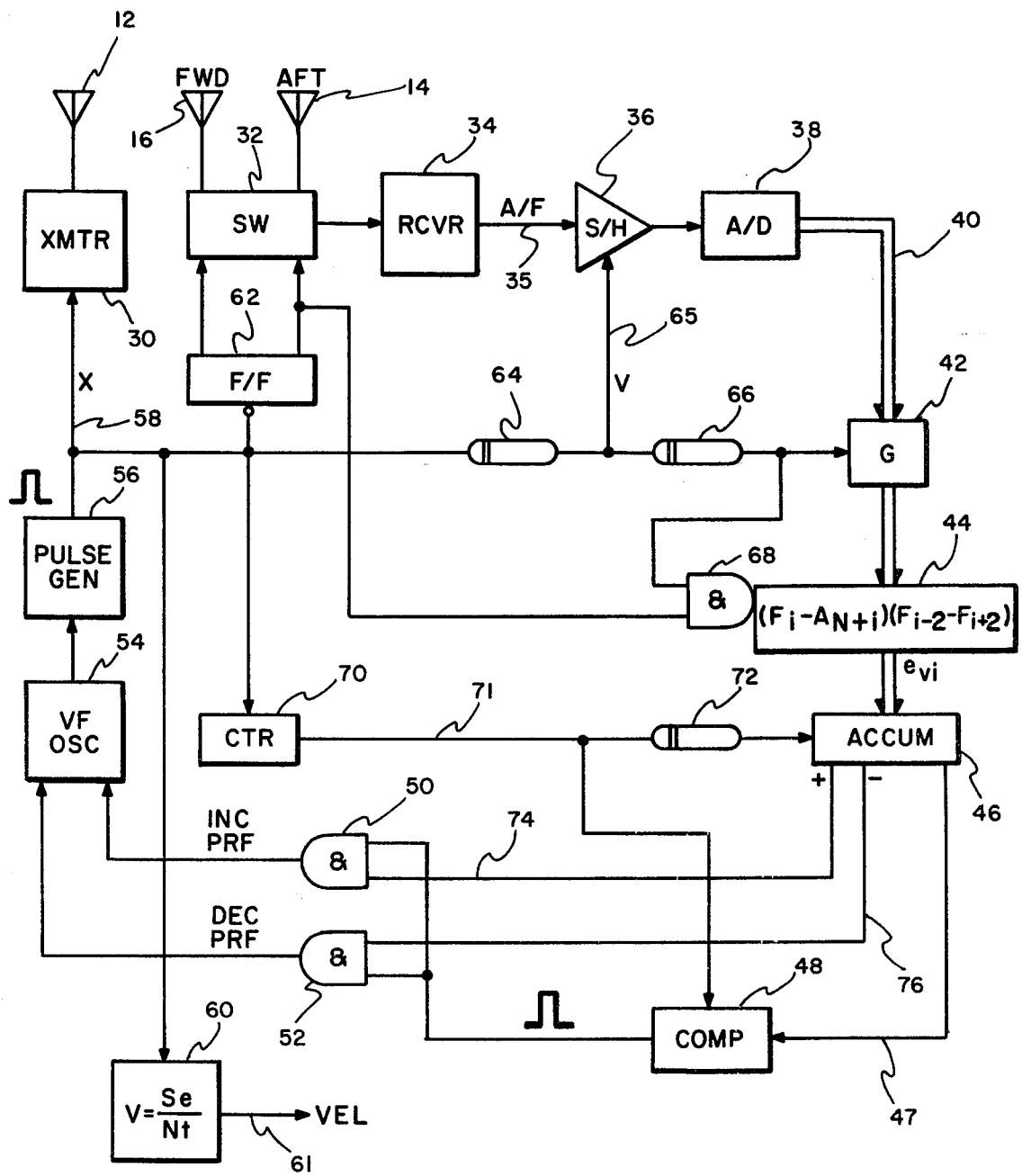
FIG. 3 is a schematic circuit diagram showing, in a simplified form, the velocity measuring and tracking portion of the system of the invention.

FIG. 3 illustrates in schematic form a simplified version of the velocity tracking portion of the system of the present invention. Transmmitting antenna 12 is energized by periodic narrow pulses (on the order of nanoseconds) generated by a transmitter 30 which responds to pulses X on line 58 fed from a pulse generator 56. The aft and forward receiving antennas 14 and 16, respectively, are coupled via an RF switching arrangement 32 into a receiver circuit 34 which operates to alternately present A and F echo pulses on output line 35.

The A and F pulses are sampled by a sample and hold circuit 36 in response to a triggering pulse V presented on line 65. Each sampled amplitude value for a given pulse is presented to an analog-to-digital converter 38 which generates a multi-bit binary word representing the sampled amplitude, which word is presented in parallel on a multi-line bus 40 through a gate circuit 42 to a computing circuit 44.

The computing circuit 44 includes digital storage circuits for storing the last eight amplitude values generated by sample and hold circuit 36 and A/D converter 38. The computing circuit further includes calculating circuits of conventional design for performing the necessary multiplication, addition and subtraction functions required for implementing the algorithm $$e_{vi} = (F_i - A_{N+i})(F_{i-2} - F_{i+2})$$

where $A_{N+i}$ represents the sampled amplitude value for the last received aft pulse, $F_{i+2}$ represents the sampled amplitude value for the forward pulse received five pulse repetition intervals earlier in time, $F_i$ represents the sampled amplitude value for the forward pulse received seven pulse repetition intervals earlier in time and $F_{i-2}$ represents the sampled amplitude value for the forward pulse received nine pulse repetition intervals earlier in time.

In response to the output from an AND circuit 68, computing circuit 44 calculates an output value in accordance with the indicated algorithm and the resultant value represents a correlation output signal $e_{vi}$ having a magnitude and a sign. As will be described subsequently, $e_{vi}$ represents the error in spatial alignment between the positions of the forward and aft antenna phase centers as measured after the time interval Nt. The correlation output signal is entered into an accumulator 46 where it is added to the then-accumulated total of previously calculated correlation output signals.

At periodic intervals, a counter 70 issues an output pulse which first triggers a comparator circuit 48 and thereafter, through operation of delay circuit 72, resets accumulator 46. The magnitude of the accumulated correlation output signal presented on line 47 to comparator 48 is compared by the latter against a predetermined reference magnitude. If the correlation output magnitude exceeds the reference magnitude, comparator 48 generates a pulse which is supplied to a pair of AND gates 50 and 52.

If the sign of the accumulated correlation output signal is positive, output line 74 from accumulator 46 will operate to energize AND 50. The output pulse from AND 50 controls a variable frequency oscillator circuit 54 such that the pulse repetition frequency of the pulses produced by pulse generator 56 increases by a predetermined increment. However, if the accumulated correlation output signal has a negative sign, the output on line 76 from accumulator 46 energizes AND 52, causing the pulse repetition frequency to be decreased by the same predetermined increment.

A calculating circuit 60, operating in response to the train of X pulses presented on line 58, generates an output signal VEL on line 61 which represents the relative velocity of aircraft 10 with respect to the ground surface 20. As indicated in FIG. 3, the velocity output signal is calculated in accordance with the previously discussed velocity formula $S_e/Nt$ where $S_e$ represents the effective spacing between the receiving phase centers, N represents the selected number of pulse repetition intervals on which the system operates (which in the present example is seven) and t represents the PRI duration.

Each X pulse appearing on line 58 operates to control a toggling flip-flop 62 which in turn controls the RF switch 32 to alternately couple the antennas 14 and 16 to receiver 34. Thus, on every other X pulse receiver 34 presents an output pulse A on line 35 representing the reflected energy received by aft antenna 14. On intermediate X pulses, flip-flop 62 controls the switch 32 such that the receiver 34 generates an output pulse F representing the reflected energy received by forward antenna 16.

The X pulses are also fed to counter 70. The latter is arranged to count in a binary sequence zero up to a predetermined number and then to reset itself and repeat the cycle. Each time the counter resets, a pulse issues on counter output line 71 to trigger comparator circuit 48 and to reset accumulator 46 in the manner previously described.

The X pulses are further fed through a delay circuit 64 to generate the V pulses for actuating sample and hold amplifier 36. Each sampling pulse V thus presented on line 65 causes the sample and hold amplifier to sample and store the amplitude value of the A or F signal which is then present on line 35. Sampling pulse V is also employed to trigger gate circuit 42 through a delay circuit 66 and to actuate the computing circuit 44 via AND 68. The latter also receives an input from the aft output side of toggling flip-flop 62 so that the computing circuit 44 is triggered into operation on receipt of each A pulse. The repetition frequency of the correlation output signals generated by circuit 44 is therefore one half that of the X pulses.

Figure 4:
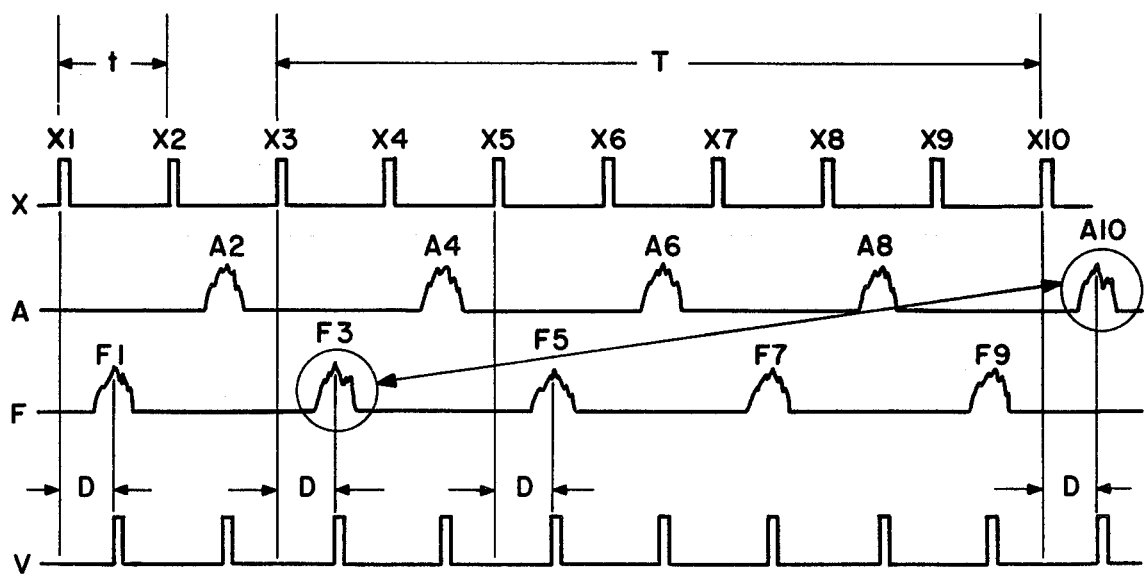
FIG. 4 is a timing diagram used in connection with the description of the operation of the circuit of FIG. 3.

With reference now to FIGS. 3 and 4, the operation of the simplified system of FIG. 3 is hereinafter described. The system operates in closed loop fashion to control the repetition frequency of the X pulses in a manner which minimizes the magnitude of the correlation signal $e_{vi}$. As shown in the timing diagram of FIG. 4, the PRI of the transmitted X pulses is represented by the time duration t. After each X pulse, one of the receiving antennas 14 or 16 receives an echo pulse and an A or F signal is generated by the receiver. As shown in FIG. 4, the reflection of transmitted pulse X1 is received at forward antenna 16 and is detected to produce the signal F1. Transmitted pulse X2 is detected by the aft antenna 14 and echo pulse A2 is produced in response thereto. Forward and aft echo pulses are detected in an alternating sequence due to the toggling action of flip-flop 62.

The detected echo pulses are each amplitude-sampled by S/H circuit 36 at the same relative instant in response to the V pulses. The latter occur at a predetermined interval D (FIG. 4) after each X pulse.

Each amplitude sample taken by S/H 36 is converted into a binary digital value by A/D converter 38 and gated to storage and computing circuit 44. Computing circuit 44 includes appropriate storage circuits for storing the most current ten values produced by A/D circuit 38. The storage function may be performed, for example, by a ten-stage register arranged such that each stage is capable of storing the multi-bit word representing a digitized amplitude sample. Each time a new A pulse is received, the computing circuit 44 is actuated to calculate a correlation output value $e_{vi}$ in accordance with the algorithm indicated in FIG. 3. As previously noted, each value of $e_{vi}$ is an error value representing the spatial misalignment between the position of the aft antenna phase center and the position occupied by the transmitting antenna phase center N pulse repetition intervals earlier in time.

Implementation of the algorithm requires computation of the four product values $F_i \cdot F_{i-2}$, $F_i \cdot F_{i+2}$, $A_{N+i} \cdot F_{i-2}$ and $A_{N+i} \cdot F_{i+2}$ followed by the summing of these values in accordance with the expression $$e_{vi} = F_i F_{i-2} - F_i F_{i+2} - A_{N+i} F_{i-2} + A_{N+i} F_{i+2} \quad (3)$$

Each correlation output value thus computed is entered into accumulator 46 and a succession of such values is accumulated over an "update interval" as determined by counter 70. One update interval may comprise, for example, 50 computation cycles of the computing circuit 44. The number of cycles depends on the amount of smoothing desired.

After each update interval the accumulated value of $e_v$ is compared against a predetermined threshold value by comparator 48 and if the accumulated error value exceeds the threshold level the system operates to adjust the PRI between the X pulses by controlling variable frequency oscillator 54 in accordance with the sign of the accumulated error value.

The sign of the error represents the direction of misalignment of the aforementioned phase center positions. As previously mentioned, each computation performed by circuit 44 compares the sampled amplitude value for the last-received aft pulse with the forward pulse previously received seven pulse repitition intervals earlier in time. This is shown in FIG. 4 by the arrow interconnecting the two circled pulses F3 and A10. If the pluse repetition interval t is set to the correct value, these two compared pulses will match exactly since they represent reflections from exactly the same portion of surface terrain as previously explained in connection with FIG. 1.

However, if the pulse repetition interval is too short, the aft pulse A10 will represent the pulse reflection from a slightly different area of terrain from that which generated pulse reflection F3 and thus the A10 echo will represent a slightly different collection of scatterers located an incremental distance in front of the array of scatterers that produced F3. In addition, the A10 scatterers will be viewed at a slightly different angle compared to the F3 scatterers. Correlation of the F3 and A10 pulses under these circumstances over the period of the update interval will produce a negative correlation output value which exceeds the predetermined reference value stored in comparator 48 (FIG. 31). On termination of the update interval a pluse from AND circuit 52 causes the PRF of variable frequency oscillator 54 to decrease. This will increase the pulse repetition interval and reduce the correlation output error, thus tending to correct the spatial misalignment error which previously existed.

If, on the other hand, the PRI is too long, spatial misalignment of the antenna phase centers will occur in the opposite direction. That is, the aft pulses will be reflected from an area of the ground terrain slightly beyond the area which reflected the previously received forward pulses and a positive correlation output value results. In this case the tracking loop operates through AND circuit 50 to increase the PRF of oscillator 54, whereby the PRI is sortened to reduce the correlation error and correct the phase center misalignment.

As is apparent, the tracking loop operates on a continuous basis to maintain the correlation error at a minimum magnitude whereupon maximum correlation between the successive pairs of pulses $F_i$ and $A_{N+i}$ is maintained. This enables the circuit 60 is provide a continuous readout of the aircraft ground velocity as a function of the PRF of the transmitted pulses.

The manner in which the sign of the correlation output is calculated can be understood from inspection of the above expanded error equation (3). It is noted that subtraction of the detected amplitude values for the two pulses being compared ($F_i$ and $A_{N+i}$) would not by itself detect the sign or direction of the correlation error. The correlation algorithm therefore additionally calls for each of the amplitude values representing these pulses to be multiplied by the amplitude values for the two forward pulses $F_{i-2}$ and $F_{i+2}$.

To appreciate why this results in a directional error indication, the relationship between the factors in equation (3) has to be understood. The factor $F_i \cdot F_{i-2}$ is the product of two consecutive forward pulse amplitude samples. As shown in FIG. 1, the forward (X) displacement between the two samples is determined by the PRI. The factor $F_i \cdot F_{i+2}$ is also the product of two consecutive forward pulse amplitude samples and if the PRI is constant as shown in FIG. 1, the X displacement between the two samples is the same as for the $F_i$ and $F_{i-2}$ samples. Therefore the two product factors are equal when averaged over a smoothing time period. The difference of the two factors yields a zero result.

The factors $A_{N+i} \cdot F_{i-2}$ and $A_{N+i} \cdot F_{i+2}$ in equation (3) represent the product of a single aft pulse amplitude sample with two forward pulse amplitude samples. If the X displacement of the aft phase center during each PRI places the phase center exactly where the transmitting antenna was N PRIs earlier, then the two product factors will be equal and their difference will be zero over the smoothing period. $e_{vi}$ at the end of the period will thus also equal zero.

However, if the PRI is too short such that X displacement of the aft phase center during each PRI does not move it quite far enough to bring it into exact alignment with the position the transmitting antenna occupied N PRIs earlier, then each aft pulse sample will resemble the forward pulse sample generated $N-2$ PRIs earlier in time more closely than it will resemble the forward sample enerated $N+2$ PRIs earlier. This is because the aft sample will have been reflected from a portion of the terrain closer to that which reflected the $F_{i-2}$ pulse than to that which reflected the $F_{i+2}$ pulse. Thus the factor $A_{N+i} \cdot F_{i-2}$ will be greater than the factor $A_{N+i} \cdot F_{i+2}$ and equation (3) will accumulate to a negative value over the smoothing period.

Figure 5:
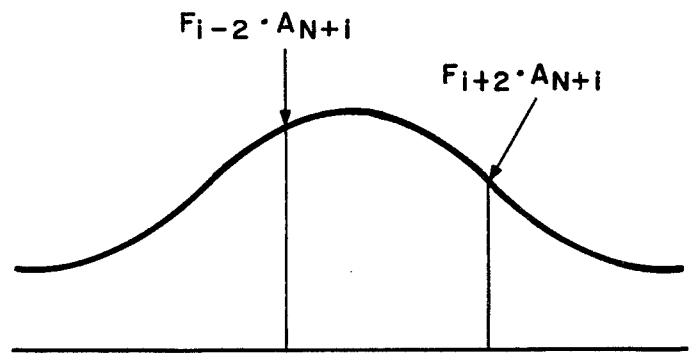
FIG. 5 is a curve illustrating the crosscorrelation between aft and forward pulse samples.

On the other hand, if the PRI is too long a positive value for $e_{vi}$ will be obtained. FIG. 5 shows some typical values of the smoothed product of the forward and aft pulse samples (the product smoothed for a long time is called the crosscorrelation function). the figure shows the magnitude of the two products generated in the case of a PRI which is too short. As shown in FIG. 3, a positive correlation output $e_{vi}$ produces an increase in the PRF, thus shortening the PRI, and a negative correlation output produces a decrease in the PRF.

By thus utilizing a succession of echo pulses and crosscorrelating the forward and aft pulses in this manner, the signed error signal required to operate the velocity tracking loop is obtained with only a single forward and single aft receiving phase center. Prior systems such as that described in the aforementioned U.S. Pat. No. 3,147,477 require at least two aft phase centers for producing the necessary signed error signal.

The selection of the interger N will, in any given system, be a function of various system parameters. The distance S and the maximum expected vehicle acceleration are two important factors. The higher the maximum expected acceleration is, the larger N will have to be to enable continuous reliable velocity tracking.

FIGS. 6-9 illustrate, in greater detail, a preferred embodiment of the invention. In the simplified system of FIG. 3 it was assumed that the aircraft travelled along its longitudinal axis and that no drift angle or drift velocity was present. Furthermore, the system of FIG. 3 does not include the range tracking circuits necessary to provide for range-gated operation of the receiver which, in an actual system, is usually necessary to enable the system to properly lock onto and track ground reflections as the aircraft undergoes altitude changes or as the height of the terrain below it varies. The system illustrated in FIGS. 6 through 9 incorporates means to enable accurate velocity and direction (drift angle) sensing and tracking under conditions where aircraft drift and altitude variations are experienced.

Figure 6:
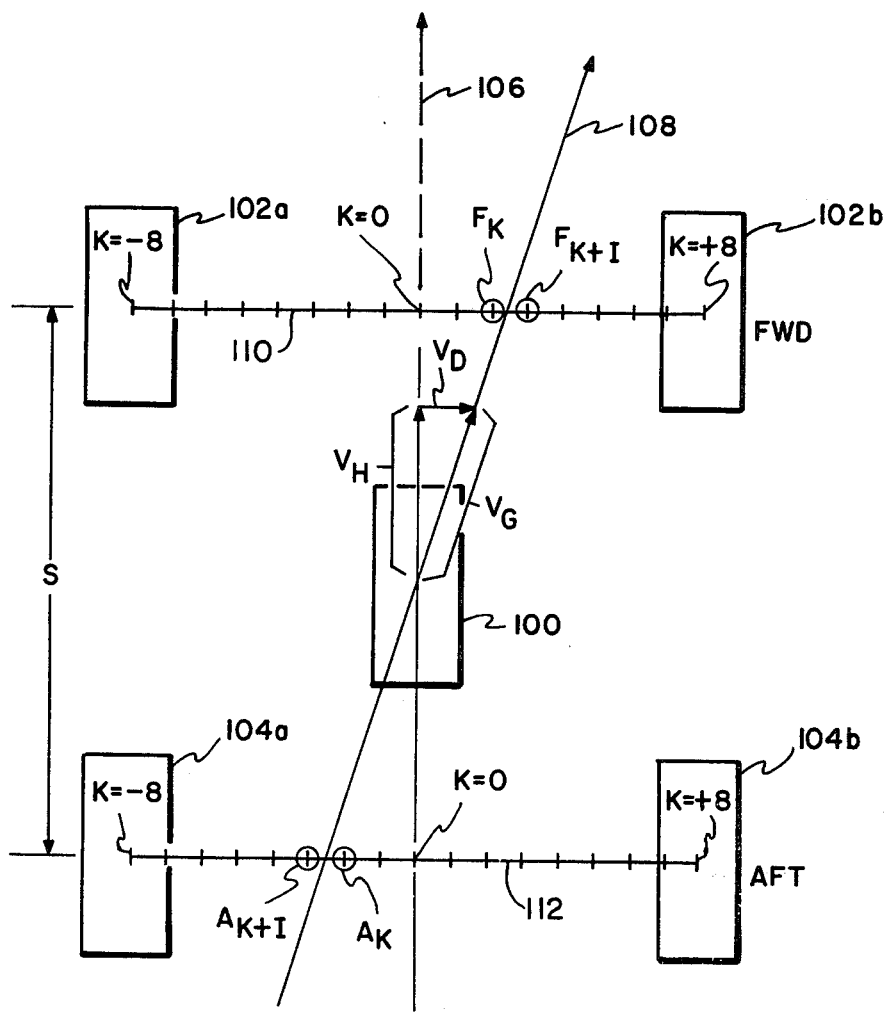
FIG. 6 is a schematic diagram illustrating the geometry of a form of transmitting and receiving antenna structure which may be utilized with a system for measuring and tracking relative heading velocity, drift velocity and direction (drift angle).

FIG. 6 shows in a schematic plan illustration an antenna arrangement for both transmitting and receiving pulsed wave energy. Transmitting antenna 100 is positioned midway between a pair of forward receiving antennas 102a, 102b and a pair of aft receiving antennas 104a and 104b. the longitudinal axis of the aircraft (aircraft heading) is indicated by the dashed arrow 106 while the true ground track of the aircraft is indicated by the solid arrow 108. As will be described in detail subsequently, the receiving antenna pairs are operated in a manner such that their effective phase center locations lie somewhere on a line joining their actual phase centers. That is, means are provided for combining and controlling the outputs of antennas 102a and 102b so that the location of the forward energy receiving phase center actually lies at a selected point on the line 110. Similarly, the outputs of aft antennas 104a and $\psi b$ are combined and controlled so that the aft phase center is actually located at a selected point on the line 112.

The antenna outputs are controlled so that a total of seventeen possible forward phase center locations are available along line 110 and a total of seventeen aft phase center locations are available along the line 112. As will be described hereinafter, the phase center location is a function of a factor K. When K equals zero the forward and aft phase center locations lie on the longitudinal axis of the aircraft. When K equals plus eight the forward phase center location is shifted all the way to the right while the aft location is shifted all the way to the left. When K equals minus eight the opposite displacement is effected.

Figure 7A:
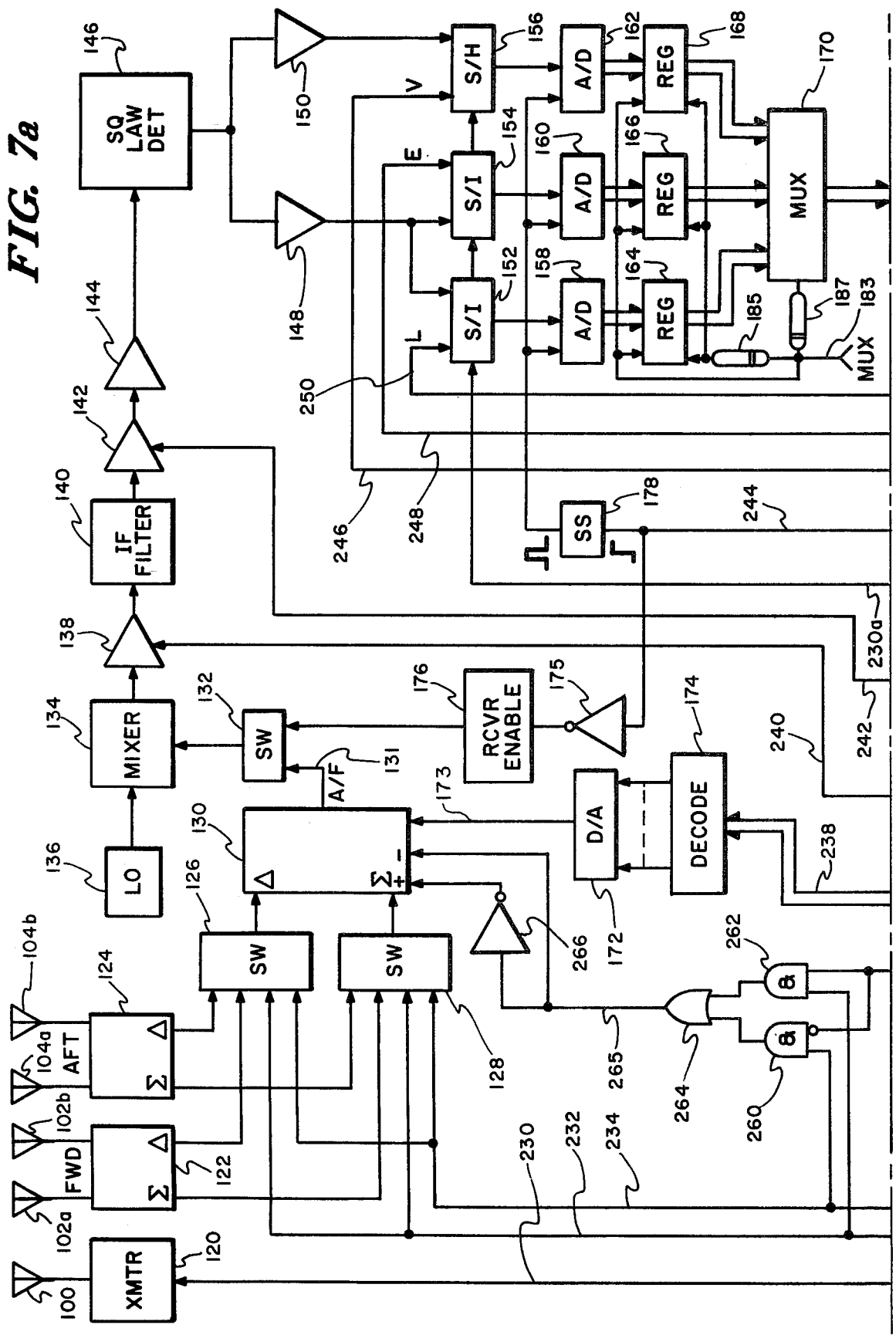
FIG. 7a and 7b are schematic circuit diagrams which, taken together, illustrate a system for processing pulses received by the antenna structure of FIG. 6 for determining heading and drift velocity.
Figure 7B:
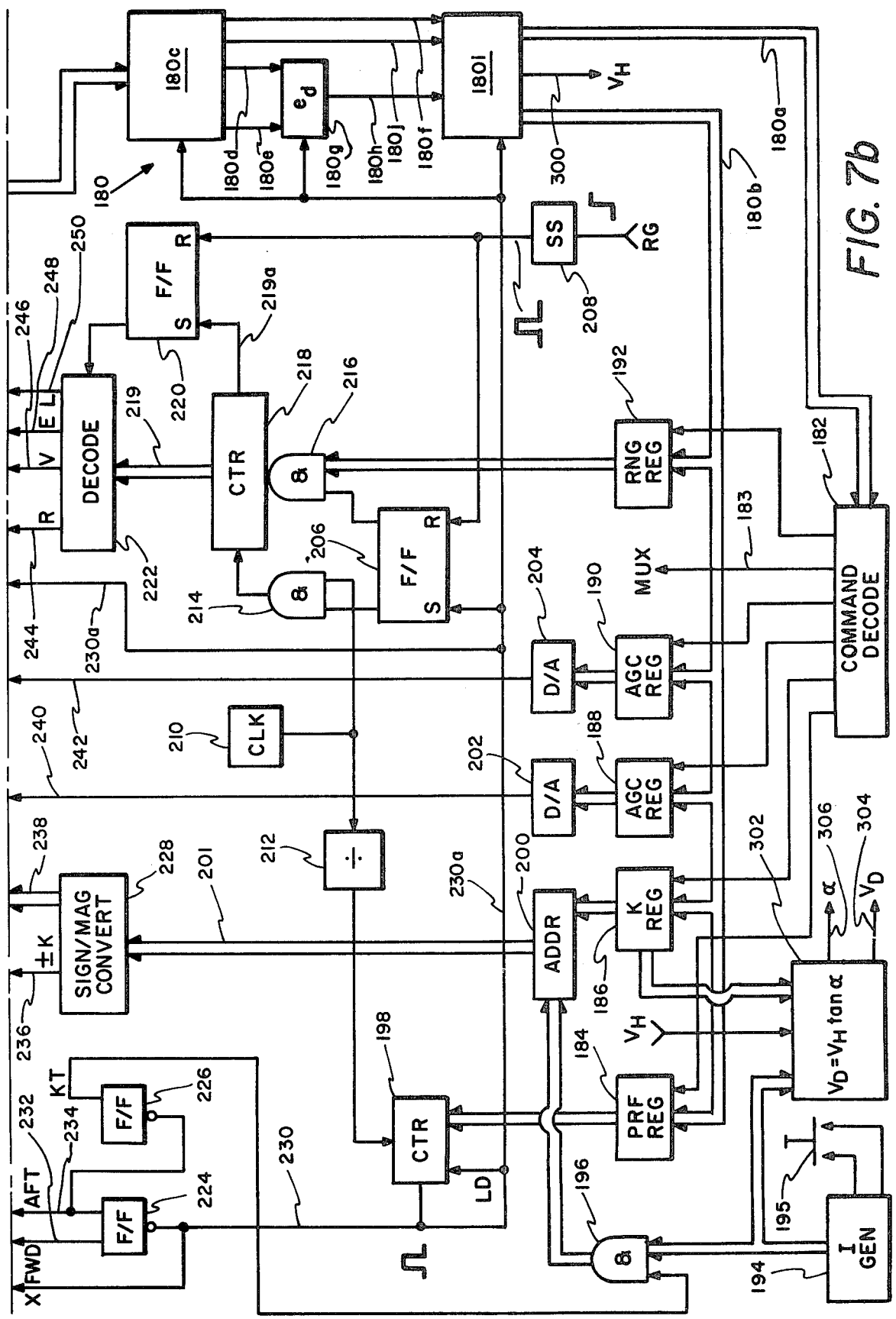

The system for controlling the antenna arrangement of FIG. 6 and for processing the pulse reflections received thereby is shown in FIGS. 7a and 7b. The two figures should be placed top-to-bottom with FIG. 7a at the top.

A transmitter 120 is triggered by a source of X pulses on line 230 to feed a continuous series of pulses to transmitting antenna 100. The source of X pulses is generated by a counter 198 which produces a pulse on output line 230 each time it progresses from the all-one to all-zero state. A continuous supply of drive pulses is supplied to counter 198 via a frequency divider circuit 212 from a fixed frequency clock 210.

Forward antennas 102a and 102b are connected to a rf hybrid 122 which has its sum output connected to the sum input of a second hybrid 130 through an RF switch 128. The delta output of hybrid 122 is fed to the delta input of hybrid 130 through a second RF switch 126. Alternating forward and aft control pulses are supplied to the switches 126 and 128 via lines 232 and 234 from a toggling flip-flop 224.

When the flip-flop is switched to its forward state, switches 126 and 128 couple the sum and delta outputs of hybrid 122 to the sum and delta inputs, respectively, of hybrid 130. This couples the combined outputs of the forward antennas 102a and 102 b to output line 131 so that reflected pulses received by the forward antennas are coupled into the receiver unit through an RF switch 132.

When flip-flop 224 switches to its aft state the signal on line 234 controls switches 126 and 128 to couple the combined output from aft antennas 104a and 104b into the receiver through the hybrid 130. As is explained in detail hereinafter, hybrid 130 receives three control inputs from DAC 172, OR 264 and inverter 266 which operate to selectively control the lateral position of the effective phase center locations of the forward and aft antenna pairs.

The output from the antennas is channelled to a mixer 134 where it is converted to an IF signal through the operation of the mixer and a local oscillator 136. The IF signal is fed through a pair of controlled gain amplifiers 138 and 142 and an IF filter 140 and via a fixed gain amplifier 144 to a square law detector 146. The latter demodulates the signal through envelope detection. The output of the square law detector 146 is a voltage-time representation of the reflected forward (F) and aft (A) echo pulses substantially in the form shown in FIG. 2b.

these detected A and F pulses are fed through a pair of amplifiers 148 and 150 to sampling circuits 152, 154 and 156. Circuits 152 and 154 are conventional integrating sample and hold amplifiers which are used for early and late gate range tracking of the ground terrain. Circuit 156 is a standard trailing-edge sample and hold amplifier which stores an amplitude value representing the instantaneous magnitude of the A and F signal present at the output of amplifier 150 at the instant defined by the trailing edge of a sampling pulse V presented on line 246. The sample and hold circuits 152 and 154 are controlled by late-gate and early-gate timing pulses L and E, respectively, presented on lines 250 and 248.

Each signal level stored in the sample and hold circuits 152, 154 and 156 is converted to a multi-bit binary word by the analog-to-digital converters circuits 158, 160 and 162. Each of the digital values generated at the output of A/D converters 158, 160 and 162 is entered into a storage register 164, 166 and 168, respectively. The values stored in the registers are transferred to a central processing unit (CPU) 180 in succession by a multiplexer 170 in response to a MUX signal presented on line 183.

CPU 180 stores the input values received through multiplexer 170 and processes those values to provide on output line 180b PRF values which are utilized for velocity tracking, range values which are utilized for range tracking, K values which are used for lateral shift control of the forward and aft antenna phase center locations and automatic gain control (AGC) values which are used for controlling the gain of the amplifiers 138 and 142 in the receiver. In addition, CPU 180 generates appropriately timed command words which are fed on line 180a to a command decode circuit 182 which generates timing signals for controlling the sequence of the various system functions.

In response to each X pulse CPU 180 issues a control word to decoder 182 which causes generation of a MUX control signal on line 183. The MUX signal transfers the sampled and intergrated early and late gate values present in registers 166 and 164, respectively, along with the amplitude value present in register 168 into the CPU. The latter processes the values in accordance with a predetermined algorithm to detemine whether the range of the ground terrain has shifted, due either to a change in the aircraft's altitude or to a change in the level of the terrain, or both, and to calculate the correlation error in connection with the velocity measuring and tracking function.

If a range shift has occurred, the CPU 180 transfers a new range value in the form of a binary coded word into range register 192. This range value is subsequently shifted into a counter 218 through AND gates 216 and operates to cause the timing of the range gate interval to shift whereupon the receiver can be properly gated to detect and sample only valid groundreturn pulses. The operation of this portion of the system is explained in detail in the subsequent operational description.

As in the system previously described in connection with FIG. 3, velocity tracking is controlled by adjusting the pulse repetition frequency of the X pulse train. The sampled amplitude values are stored and processed in CPU 180 in accordance with a predetermined algorithm to be described in detail subsequently. When the CPU determines that the PRF must be adjusted, it transfers a new PRF value register 184 via line 180b. When the next X output is generated by counter 198 on line 230, it is fed back and presented to the load input LD of counter 198 whereupon the new PRF value stored in register 184 is loaded into the counter.

The time of occurrence of the next X pulse generated by the counter is determined by the stored PRF number and accordingly the pulse repetition interval between X pulses is controlled by the stored PRF value. The same stored PRF value remains in register 184 and continues in use on a repeated basis until it is updated by CPU 180.

The gain of receiver amplifiers 138 and 142 is adjusted by the AGC values stored in the registers 188 and 190. The stored binary values are converted to analog signals levels by digital-to-analog converters 202 and 204, respectively, and presented to the amplifiers over lines 240 and 242, respectively. CPU 180 controls the AGC values stored in registers 188 and 190 in a manner such as to adjust the gain of amplifiers 138 and 142 in order to maintain a constant power level in the sum of the early and late values accumulated over each range update interval.

As previously mentioned, the system employs means for laterally displacing the forward and aft phase center locations to enable detection and following of the true ground track of the aircraft. The elements which function to control the lateral position of the antenna phase centers includes K register 186, adder 200, I generator 194, sign-magnitude converter circuit 228, decode circuit 174, converter circuit 172 and the sign switching circuit including AND 260, 262, OR 264 and inverter 266.

Referring back to FIG. 6, the arrangement for detecting forward and aft pulses is described. In the simplified system previously described in connection with FIG. 3 each aft pulse was compared against the forward pluse detected N pulse repetition intervals earlier in time. Each such comparison resulted in determination of a correlation error value ($e_v$) and a plurality of such values were accumulated over an update interval. The accumulated output was utilized for controlling the velocity tracking loop. In the system illustrated in FIGS. 6–9, each correlation error value is computed based on a pair of F pulses and a pair of A pulses. As shown in FIG. 6, the sampling sequence for each four pulse data set is taken in the sequence $$F_K A_{K+1} F_{K+1} A_K \tag{4}$$

$F_K$ represents the reflected pulse received at the forward phase center location on the left of ground track 108 (FIG. 6). $F_{K+1}$ represents the forward phase center location on the right-hand side of ground track 108. The opposite is true for the aft phase center locations. That is, $A_K$ represents the phase center location on the right-hand side of ground track 108 while $A_{K+1}$ represents the phase center location on the left side of the ground track. Amplitude values are generated by A/D converter 162 in the sequence noted in expression (4) above and the amplitude values are stored in CPU 180 for processing.

Control of lateral phase center displacement is effected as follows. A four-bit binary code stored in K register 186 operates together with a three-bit code stored in I generator 194 to determine the lateral position of the forward and aft phase center locations by controlling the voltage level presented to hybrid 130 on line 173 and also by controlling the + and − inputs thereto. The code stored in the K register represents the minus eight forward phase center location by the bit combination 0000, the minus seven phase center location by 0001, etc. on up to the plus seven phase center location which is represented by 1111. In this continuous binary sequence the center or zero phase center location is represented by the bit combination 1000. The value in the K register is not changed throughout any given update interval.

The I generator circuit 194 has manually operable switching means 195 whereby binary code sequences representing selected phase center offsets can be entered. For example, if it is desired to have a lateral displacement between the two forward and aft phase center locations of two increments on the horizontal scale (lines 110 and 112 of FIG. 6), the binary number 010 is entered into the three bit register of circuit 194.

The offset code or I factor stored in circuit 194 is gated by a series of AND circuits 196 to one input of adder 200 in response to an output signal KT from toggling flip-flop 226. The latter reverses its state each time the AFT output of flip-flop 224 switches positive. Thus, AND gate 196 is energized when AFT goes positive and remains energized for the duration of that AFT signal and for the duration of the following FWD signal. Thereafter, the AND gates 196 are deenergized for the duration of the following pair of AFT and FWD signals.

Adder 200 performs a straight-forward binary addition operation and passes the sum on line 201 to the sign/magnitude converter circuit 228. The latter decodes the binary value presented on line 201 and provides a single-bit sign output on line 236 along with a three-bit magnitude output on line 238. Circuit 228 converts the negative numbers (0000 through 0111) presented on line 201 into three-bit binary coded representations of positive numbers of the same magnitude. For example, a minus three (0101) on input line 201 is converted to a plus three (011) at output line 238. Positive values appearing on line 201 pass through unaltered (less their high-order bit) to output line 238.

Converter circuit 228 also includes appropriate logic circuitry for generating a sign bit for controlling the + and − inputs to hybrid 130. A binary code representing a positive number appearing on line 201 produces a positive level output on line 236 and a negative binary number on line 201 causes a negative level signal to be presented on line 236. The arrangement of logic circuits in converter 228 is constructed in accordance with straight-forward decoding logic design conventions and, for the sake of simplicity, further disclosure thereof is omitted.

The sign bit on line 236 is passed through a switching arrangement including AND circuits 260 and 262 and OR circuit 264. The sign bit on line 236 is presented in parallel to an input of AND 262 and to an inverting input provided at AND 260. The latter is conditioned by a positive AFT signal on line 234 while AND 262 is conditioned by a positive FWD level on line 232. OR 264 combines the outputs of the two AND circuits onto a single line 265 which is presented to the negative control input of hybrid circuit 130. The signal on line 265 is presented to the positive input of the hybrid through an inverter circuit 266. This arrangement enables the proper selection of all four phase center locations through the use of a single K factor and a single I factor stored in the registers 186 and 194, respectively. The value of the K factor is controlled by CPU 180 as part of the drift angle/drift velocity tracking function which is described subsequently. A calculating circuit 302 provides an output signal $V_D$ on line 304 by processing the K and I values stored in registers 186 and 194 in accordance with the equation $V_D = V_H \tan\alpha$, where $V_D$ represents drift velocity, $V_H$ represents heading velocity which is received from CPU 180 and $\alpha$ represents the drift angle which is calculated by circuit 302 as a function of K and I, as is described subsequently.

CPU 180 is shown as comprising three separate calculating circuits 180c, 180g and 180i for processing the various computations required for determining the various signals used in establishing values for $V_H$, PRF, K, RNG and AGC. The operation of the circuits is described subsequently.

At the start of each four point data sampling cycle described by expression (4) above, KT is in its negative state so that AND 196 is deenergized. The phase center offset factor I is thus not presented to adder 200 and the forward phase center location $F_K$ (FIG. 6) is defined strictly by the K factor. When flip-flop 224 toggles to couple the aft antenna pair to the receiver KT shifts positive and this gates the I factor to adder 200 whereupon the aft phase center location is determined by K + I. It is also noted that AND 260 (FIG. 7b) of the sign control switch operates at this time to invert the sign of the K + I value, whereupon the sampling point $A_{K+I}$ (FIG. 6) is defined. Thereafter, flip-flop 224 again toggles to bring FWD back to its positive state. KT does not change at this time. Therefore, K + I determines the forward sampling point $F_{K+I}$ and AND 262 causes the sign control to locate the phase center on the positive side (FIG. 6). Finally, AFT switches positive and KT switches negative whereupon the fourth sampling point $A_K$ is established.

Figure 8:
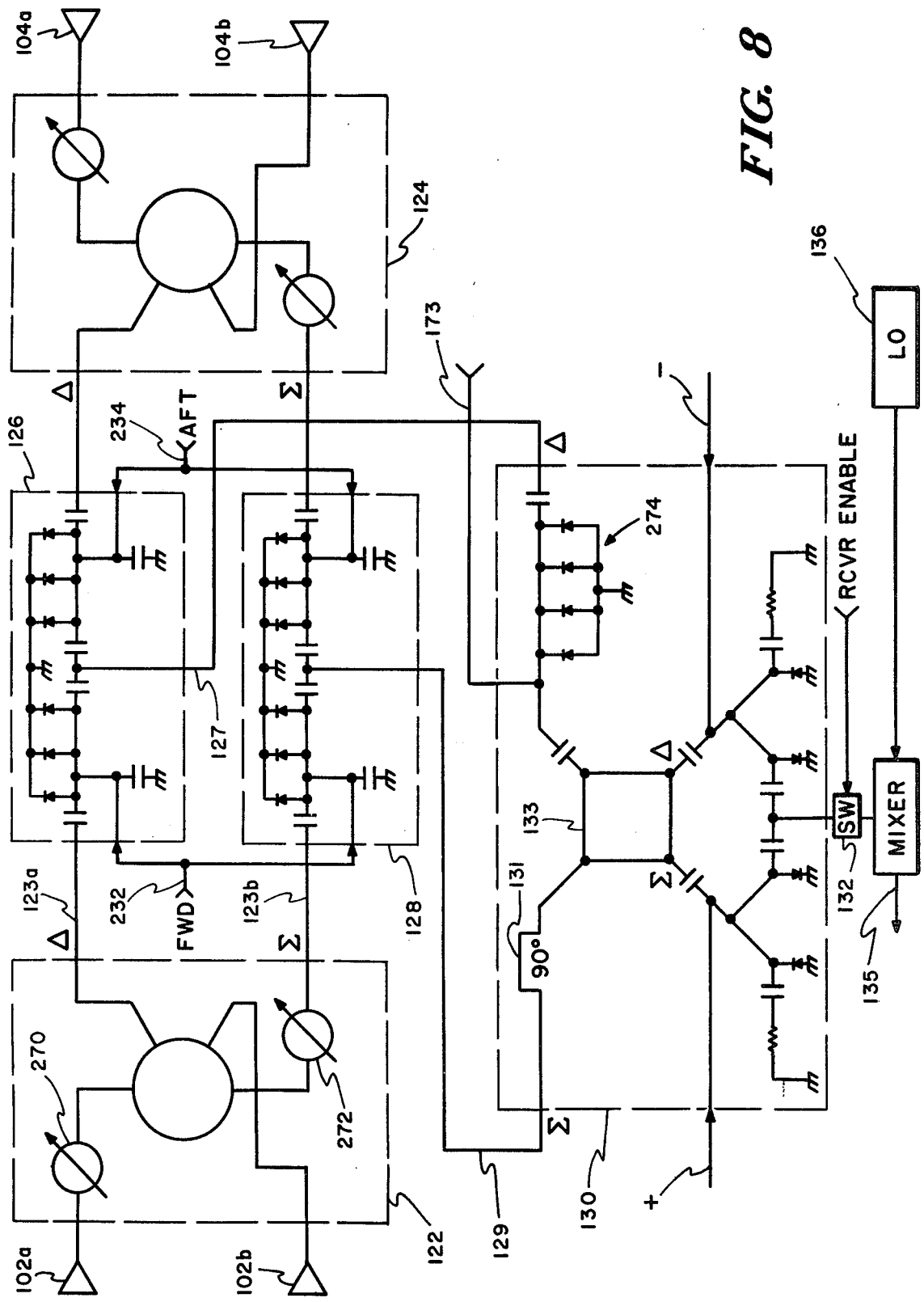
FIG. 8 is a schematic diagram illustrating the details of the receiving antenna utilized in the FIG. 7 system.

Referring to FIG. 8, the antenna arrangement utilized in the FIG. 7 system is hereinafter described in detail. Forward antennas 102a and 102b feed into two ports of an rf hybrid 122. The latter includes a pair of phaseshifters 270 and 272 provided for trimming purposes. The delta output port of hybrid 122 feeds on a line 123a to one input of an RF switch 126. The sum port of hybrid 122 is connected by a line 123b into an input of a second RF switch 128.

Aft antennas 104a and 104b are coupled through a second rf hybrid 124 in an identical arrangement whereby the delta output from hybrid 124 is fed to the other input of switch 126 and the sum output of hybrid 24 is fed to the second input of switch 128.

FWD control pulses from control flip-flop 224 (FIG. 7b) are fed on line 232 to the first control inputs of switches 126 and 128. Similarly, AFT control pulses are fed on line 234 to the second control inputs of the switches. Since the FWD and AFT signals are always at complementary levels, the sum and delta outputs of hybrid 122 are connected through to output lines 129 and 127, respectively, of switches 128 and 126 when the FWD signal is in a first state. When the FWD signal is in the reverse state, the sum and delta outputs of hybrid 124 are connected through to switches output lines 129 and 127, respectively.

Output line 127 is connected to a first input port of a controllable stripline hybrid network 130 while the signal on output line 129 is coupled to the second input port of the network. Hybrid 130 includes a quarterwave phaseshifter 131, an internal hybrid 133 and an attenuator network 274. Hybrid 130 control inputs, two polarity control inputs + and − and an attenuation control input which is coupled to line 173. The + and − inputs are those inputs received, respectively, from inverter 266 and OR circuit 264 while the input on line 173 is generated by D/A converter 172 (FIG. 7a).

The input presented from line 173 and D/A converter 172 consists of a controlled voltage level which actuates the diode attenuation network 274 which is located in an input path to hybrid 130. The levels of the control signal progress from zero to a maximum in eight discrete steps. The levels are controlled by the three-bit binary code presented on line 238 to decode circuit 174 (FIG. 7a). When a zero level is presented to the attenuation network no attentuation is imposed on the input thereto and the signal which is presented at the output of hybrid 130 to RF switch 132 is a signal which represents the energy received at the phase center located exactly half way between the antenna set then connected. In other words, with an attentuation control input of zero on line 173 the antenna output appears at the $K = 0$ point in the diagram of FIG. 6.

Each higher control level presented on control line 173 causes the effective phase center location of the antenna to shift one location to the left or right (FIG. 6). With a maximum control level (8) presented on control line 173, maximum attentuation is applied by network 274 and the phase center location is shifted all the way to the left or right ($K = +$ or $− 8$) and the signal fed to the receiver comes from only one of the antennas of the pair.

The + and − input control lines to the hybrid network 130 control a pair of diode switching networks 276 and 278 coupled to the sum and delta ports of the internal hybrid 133. The + and − control inputs are, like the FWD and AFT inputs, always at complementary levels. When the + input is in a first state the phase center location of the receiving antennas is shifted to the right (FIG. 6) while when the + input is in the opposite state the phase center location is shifted to the left.

FIG. 8 further shows the local oscillator 136 and mixer 134 for converting the signal received through RF switch 132 from the antenna network into an IF signal on output line 135.

OPERATION OF THE FIG. 7 SYSTEM

Figure 9B:
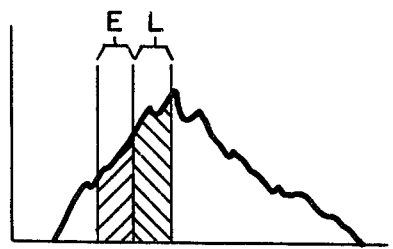
FIG. 9b is a waveform diagram illustrating the manner in which the early and late gate timing intervals are centered on an echo pulse.
Figure 9A:
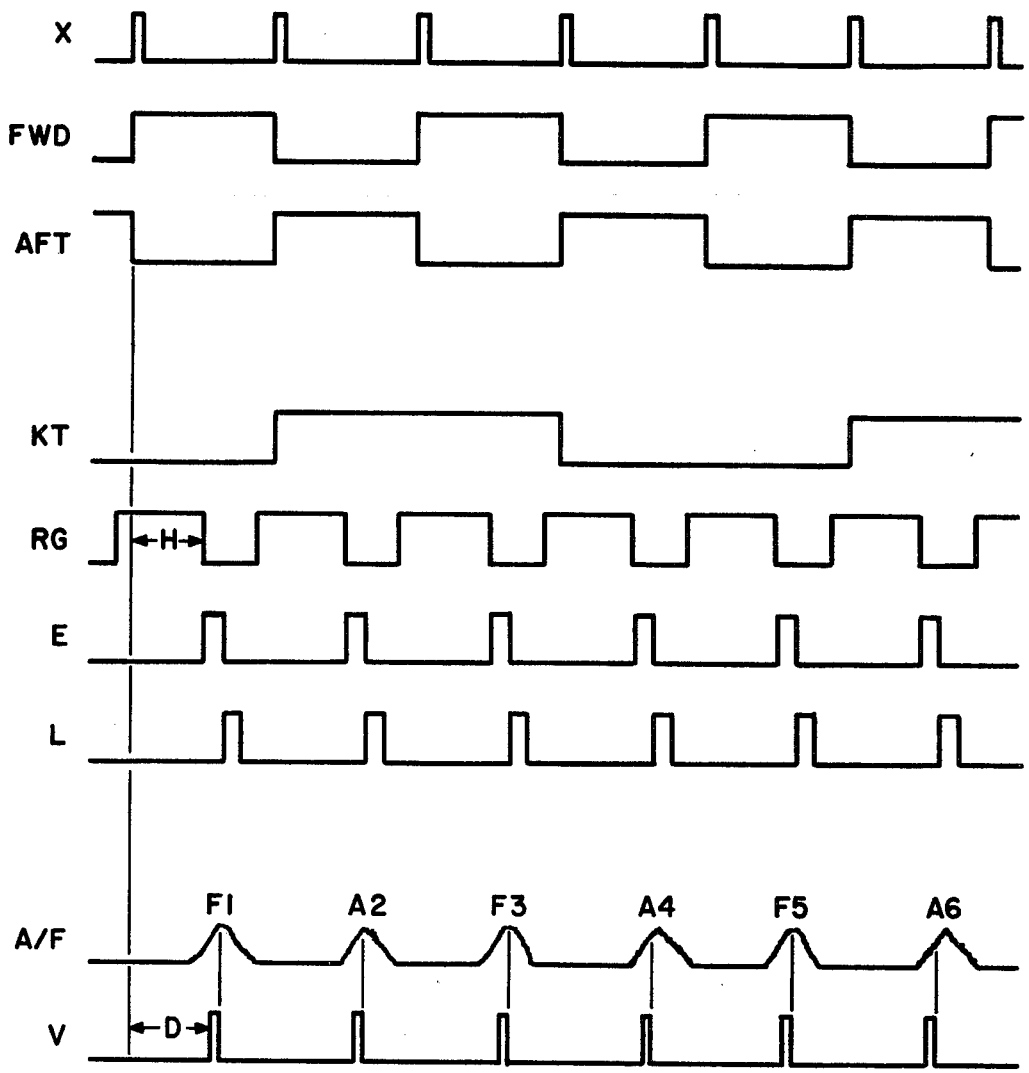
FIG. 9a is a timing diagram used in connection with the description of operation of the system shown in FIGS. 7a and 7b.

Referring to FIGS. 7a, 7b and 9a, operation of the system shown in FIGS. 7a and 7b is hereinafter described. The basic cycle timing for the system is provided by the PRF counter 198 which in turn is timed by pulses fed from clock 210. Each overflow output generated by counter 198 represents an X pulse and is fed on line 230 to the transmitter 120 to control the continuous train of transmitted X pulses (FIG. 9a). The X pulses from counter 198 also control the flip-flops 224 and 226, the sampling circuits 152, 154, 156, flip-flop 206 and the CPU 180.

The FWD and AFT signals from flip-flop 224 operate to alternately switch the reflected pulses received at the forward and aft antennas into the receiving circuits. At the same time the phase center locations of the received A and F signals are alternately displaced in a lateral direction by the operation of the K and I circuits which actuate the control inputs to hybrid 130 in the manner previously described.

As a result of the functioning of the various antenna controls, reflected pulses are received in the repetitive four-point sampling pattern which is illustrated in FIG. 6 and defined by expression (4) above. Four pulses received in accordance with this pattern are illustrated in FIG. 9a by the sequence of F and A pulses F1, A2, F3 and A4. A and F pulses continue to be detected by the receiver in this sequence and the pattern of phase center locations does not change unless CPU 180 changes the value of the K factor (or unless an operator keys in a new I factor). It is noted that if both the K and I factors are set at zero, the four point pattern just described reduces to a two point pattern, with the phase center locations alternating between the centrally located forward and aft $K = 0$ points and the system operates in virtually the same fashion as the previously described simplified FIG. 3 system.

To insure that the receiver is gated on at the proper times so as to detect only valid echo pulses received from ground terrain and to exclude noise signals received at other times, the system includes a range tracking subsystem which generates a range gate signal RG for controlling the basic receiver gating function. The signal RG is generated by decode circuit 222 (FIG. 7b) on line 244 and controls a receiver enable circuit 176 through an inverter 175. Each time RG goes negative (FIG. 9a) the receiver enable circuit 176 opens switch 132 to gate the signals detected by the receive antennas into the receiver circuits. The timing and duration of the range gate interval is controlled by counter 218. Each time an X pulse is generated from counter 198, flip-flop 206 is set whereupon AND 214 is energized to feed clock pulses to increment the counter 218 in the upward direction. The initiation of this counting sequence starts the timing of interval H shown in FIG. 9a. When counter 218 reaches the all-one state and turns over to the all-zero state, an overflow pulse issues on counter output line 219a which sets flip-flop 220 and conditions decode circuit 222 to be actuated by subsequent binary count outputs present on counter output line 219b.

Decode circuit 222 decodes the all-zero output from counter 218 which is received concidentally with the setting of flip-flop 220 to initiate the range gate signal RG. Setting of counter 218 to its all-zero state terminates the interval H and initiates the range gate interval (defined by the negative portions of the RG signal). As previously described, the negative shift in RG turns on the receiving circuits through switch 132. When counter 218 cycles up to a first predetermined count during the range gate interval, decode circuit 222 generates the timing signal E on output line 248. Commencement of the E pulse is substantially coincident with the beginning of the range gate interval as shown in FIG. 9a. The E pulse represents a so-called early sampling interval which activates sample and integrate circuit 154 to accumulate a signal level representing the integration of the detected echo pulse then present at the output of amplifier 148 over the early gate interval defined by the width of the E pulse.

On termination of the E pulse, decode circuit 222 generates a "late gate" pulse L on line 250. The L pulse is of the same width as the E pulse and operates to control sample and integrate circuit 152 which operates in the same manner as circuit 154.

At a predetermined count which occurs during the early gate interval, decode circuit 222 generates a V pulse on output line 246. The V pulse controls sample and hold circuit 156 which operates to perform a conventional trailing-edge sampling function to store a signal level representing the instantaneous amplitude value of the detected echo pulse then appearing at the output of amplifier 150. Thus, as shown in FIG. 9a, each of the A and F pulses generated at the output of the receiver circuits is sampled by sample and hold circuit 156 at a precisely controlled instant determined by the interval D following each of the transmitting X pulses. The D interval is controlled by counter 218.

The A/D converters 158, 160 and 162 generate digital signals at their respective output lines representing the signal levels stored in the sampling circuits 152, 154 and 156, respectively. A short time after termination of the L pulse, the delay being required to allow time for settling of the A/D converters, CPU 180 generates a command code output on line 180a which causes decode circuit 182 to generate a MUX signal on output line 183. MUX first operates to enter the digital output values at the A/D converters into storage registers 164, 166 and 168. Next, after a delay interval determined by delay circuit 187, MUX actuates multiplexer 170 to cause successive transmission of the three digital values stored in registers 164, 166 and 168 to CPU 180. Thereafter, following a slightly longer delay determined by circuit 185, MUX operates to reset storage registers 164, 166 and 168 in preparation for the next cycle of operation.

CPU 180, on receipt of these digital input values, processes them in accordance with a predetermined program sequence in order to accomplish the system functions of velocity and drift measurement, AGC control and range interval control. CPU 180 may be a programmable general purpose computing system or it may be a hard-wired special purpose computing system dedicated specifically to operation in the present system. In any event, a variety of standard computing systems are available to perform the function of CPU 180. The programming or design of the computing circuits can be done by conventional, straight-forward programming techniques based on the information herein provided and it is therefore unnecessary to further encumber this specification with a detailed description of the computer program.

Range tracking control is provided through use of a coded range delay number RNG which is periodically computed by CPU 180 and entered over output line 180b into the range register 192. As previously described, control of the range delay interval is necessary in order to turn the receiver circuits on at the proper time after each transmitted X pulse so that valid data representing ground-reflected pulses is received. Of course, the proper range interval will vary as the altitude of the aircraft and the level of the terrain below it changes. on to order to get the system to intially lock to the ground return, an initial range value, based upon the known altitude of the aircraft above the ground, is entered by CPU 180 into range register 192. Thereafter, as soon as RG shifts positive at the termination of a range gate interval, single-shot multivibrator 208 generates an output pulse which resets flip-flops 206 and 220. The range value stored in register 192 is entered into counter 218 through AND gate 216 immediately on the resetting of flip-flop 206.

Thereafter, on generation of the next X pulse, counter 218 is incremented in the manner previously described and the sequence of RG, E, V and L pulses is generated. CPU 180 accumulates the early and late values generated by the A/D converters 158 and 160 and periodically generates on output line 180j a range error signal based on the accumulated values. The range error signal is generated by CPU circuit 180c in accordance with the algorithm $$E_r = 2E - L$$

The values of E and L may, for example, be based on the accumulation of respective E and L values over four sampling cycles, i.e., over the duration of four pulse repetition intervals of the X pulse train. The value for the range error signal indicates the degree of misalignment present in the framing of the detected echo pulse within the early and late gate sampling intervals. The approximate desired framing of the detected pulse within the early and late gate sampling intervals is shown in FIG. 9b. As the above-indicated error algorithm indicates, it is desired to time the range gate interval such that the echo pulse energy detected during the early gate interval is one half that detected during the late gate interval. This results in the relationship shown in FIG. 9b.

CPU circuit 180i utilizes the range error signals presented on line 180j in accordance with a desired servo loop equation such that updated range delay values are periodically entered into range register 192 to adjust the interval H (FIG. 9a) to keep the detected echo pulses properly framed in the early-late gate interval. As will be apparent from the following description, this is an important function since the accuracy of the system depends on the ability of the system to amplitudesample each detected echo pulse at the same relative point in time.

CPU 180 processes the digital inputs representing the sampled amplitude values from A/D converter 162 in a manner which controls the digital value stored in the PRF register 184 to enable measurement and tracking of aircraft velocity. The true ground-track velocity is represented by the vector $V_G$ shown in FIG. 6. This is made up of the heading velocity $V_H$ (component along the aircraft axis) and the drift velocity $V_D$ (drift component perpendicular to the aircraft axis).

CPU circuit 180c processes the amplitude sample inputs generated by A/D converter 162 to provide velocity measurement and tracking in the following manner. After receiving the digitized amplitude values for each sequence four F and A pulses in accordance with expression (4) above, circuit 180c calculates a correlation error value $e_{vi}$ in accordance with the following algorithm:

$$e_{vi} = \tfrac{1}{2}[(A_{N+i} - F_i)(F_{i-2} - F_{i+2}) + (A_{N+i+2} - F_{i+2})(F_i - F_{i+4})]$$

As can be seen by comparing the above algorithm with that used in the FIG. 3 system (expression (3) above), the above algorithm simply takes one half of the error value computed for the first aft sampling point $(A_{N+i})$ as compared to its corresponding forward sampling pont $(F_i)$ summed with the error value computed for the second aft sampling point as compared to its corresponding forward sampling point. As previously described, the first aft phase center sampling point is shown as $A_{K+I}$ in FIG. 6 and its corresponding forward sample was taken at point $F_{K+I}$ at a time N pulse repetition intervals earlier. The data generated from the sampling points is represented, for example, by the amplitude values for the echo pulses F3 (shown in FIG. 9a) and A10. The second aft phase center sampling point is shown in FIG. 6 as $A_K$ and the pulse amplitude data generated for this point would be that generated for the detected echo pulse A12. Its corresponding forward sample would be F5.

The next value of $e_{vi}$ computed by the CPU would be based upon the amplitude value inputs generated for detected echo pulses A14 and A16 and their corresponding forward samples F7 and F9. CPU 180 therefore operates in repetitive cycles calculating an $e_{vi}$ value for every pair of aft pulses detected by the receiver circuits. In the above equation, therefore, i represents a series of alternate odd intergers (e.i., 3, 7, 11, etc.).

The values computed for $e_{vi}$ are presented on line 180f and accumulated over a predetermined update interval e.g., fifty sampling cycles or 200 pulse repetition intervals of the X pulse train, and the average value for $e_{vi}$ over the update interval is utilized by CPU circuit 180i for control of the PRF value stored in register 184. Changing of the stored PRF value is done by CPU 180 in accordance with an appropriate algorithm derived from a conventional servo loop equation in accordance with the loop response desired for the system.

CPU circuit 180i also functions to calculate aircraft heading velocity $V_H$ based upon the PRF factor which is periodically calculated and supplied to register 184. It will be appreciated that the numerical value represented by the number stored in register 184 represents the value of the pulse repetition interval between X pulses. To supply an output value representing aircraft heading velocity ($V_H$) CPU circuit 180i generates the value $$V_H = S_e / Nt$$

where $S_e$ represents the effective phase center spacing between the forward and aft phase centers along the longitudinal axis of the aircraft. As previously described, $S_e = S/2$ for the antenna geometry illustrated herein. N represents the number of pulse repetition intervals for which the system has been designated to operate (N equals 7 in the exemplary embodiments described above) while t represents the X pulse repetition interval as indicated by the PRF value stored in register 184.

The system operates to calculate drift velocity $V_D$ as follows. CPU circuit 180g computes a crosscorrelation difference value $e_d$ in accordance with the following algorithm $$e_d = \rho_{F_K A_K} - \rho_{F_{K+I} A_{K+I}}$$

where $\rho_{F_K A_K}$ represents the crosscorrelation of all $A_K$ aft amplitude samples with their corresponding forward amplitude samples taken at phase center $F_K$ N pulse repetition intervals earlier in time while $\rho_{F_{K+I} A_{K+I}}$ represents the crosscorrelation of all $A_{K+I}$ aft amplitude samples with their corresponding forward amplitude samples taken at phase center $F_{K+I}$ N pulse repetition intervals earlier in time. The $e_d$ value is presented to circuit 180i on line 180h. Each crosscorrelation value $\rho$ is calculated by CPU circuit 180c over an update interval comprising, for example, fifty PRIs.

The value of $\rho_{F_K A_K}$ is based, for example, on the amplitude samples derived for A12/F5, A16/F9, A20/F13, etc. over the update interval. On the other hand $\rho_{F_{K+I} A_{K+I}}$ is based on the amplitude samples derived for A10/F3, A14/F7, A18/F11, etc. over the update interval.

To compute $\rho_{F_K A_K}$ CPU circuit 180c calculates the following for an update interval:

$$\rho_{F_K A_K} = \frac{E\{F_K A_K\} - \eta_{F_K} \eta_{A_K}}{\sigma_{F_K} \sigma_{A_K}}$$

where E $\{F_K A_K\}$ represents the expected value of the product of all $F_K A_K$ samples in accordance with $$E\{F_K A_K\} = < \frac{1}{n} \overset{n}{\Sigma} F_K A_K$$

where n is the number of terms over the update interval. $\eta_{F_K} \eta_{A_K}$ represents the product of mean values of the $F_K$ and $A_K$ samples in accordance with $$\eta_{F_K} \eta_{A_K} = (\frac{1}{m} \overset{m}{\Sigma} F_K)(\frac{1}{m} \overset{m}{\Sigma} A_K)$$

where m is the number of values over the update interval. $\sigma_{F_K} \sigma_{A_K}$ represents the product of standard deviation values of the $F_K$ and $A_K$ in accordance with $$\sigma_{F_K} \sigma_{A_K} = [\frac{1}{m} \overset{m}{\Sigma} F_K^2 - \eta_{F_K}^2]^{\frac{1}{2}} \cdot [\frac{1}{m} \overset{m}{\Sigma} A_K^2 - \eta_{A_K}^2]^{\frac{1}{2}}$$

The $\rho_{F_K A_K}$ value is supplied on line 180d to CPU circuit 180g. CPU circuit 180c computes the $\rho_{F_{K+I} A_{K+I}}$ value in the same fashion using the corresponding equation $$\rho_{F_{K+I} A_{K+I}} = \frac{E\{F_{K+I} A_{K+I}\} - \eta_{F_{K+I}} \eta_{A_{K+I}}}{\sigma_{F_{K+I}} \sigma_{A_{K+I}}}$$

The $\rho_{F_{K+I} A_{K+I}}$ value is supplied on line 180c to CPU circuit 180g.

If the K factor used to determine the amount of lateral offset of the forward and aft phase center locations produces the correct positioning of the phase centers so as to exactly bracket the true ground track line (as shown in FIG. 6 where arrow 108 represents the ground track), then each value of $e_d$ computed by CPU circuit 180g in the manner described above will approach zero. If, however, the ground track does not lie between the phase centers then $e_d$ will exceed some predetermined reference value and circuit 180i operates to select a new K factor value and transfers it to K register 186, whereupon a new set of phase center locations is used during the next update interval. Selection of the next K factor is determined by the sign of the $e_d$ value. As previously explained, the I factor which determines the lateral spacing between the forward and aft phase center locations is a constant which can be altered only through operation of the manual key input switch 195. The value of I is determined by the type of terrain over which the aircraft is operating and generally is selected as an even integer.

The system thus operates in closed loop fashion to adjust the K factor to maintain $e_d$ at a minimum value. Knowing the K and I factors at any given instant enables the system to determine the drift angle $\alpha$. The latter is the angle between the $V_H$ and $V_G$ vectors as shown in FIG. 6. Computing circuit 302 (FIG. 7b) calculates $\alpha$ based on inputs from registers 186 and 194 and applies it to the $V_H$ value (received from CPU 180) to determine the drift velocity $V_D$ in accordance with the expression $$V_D = V_H \tan \alpha$$

The values of $V_D$ and $\alpha$ are fed out on output lines 304 and 306, respectively, for display purposes. Likewise, CPU 180 provides a $V_H$ signal on output line 300. While circuit 302 is shown in FIG. 7b as a separate circuit subsystem, its function may, if desired, be implemented within CPU 180.

It can be appreciated that CPU 180 may be either a special purpose computer having individual circuits 180c, 180g and 180i specifically constructed (hardwired) to implement the algorithms described above for measuring and tracking heading velocity and drift velocity or it may be a general purpose computer programmed to carry out the indicated calculations. The software required to carry out the necessary data processing steps for any given computer may be derived through straightforward programming techniques given the above algorithms and thus for purposes of simplification detailed disclosure of the software is omitted from this specification.

Figure 10:
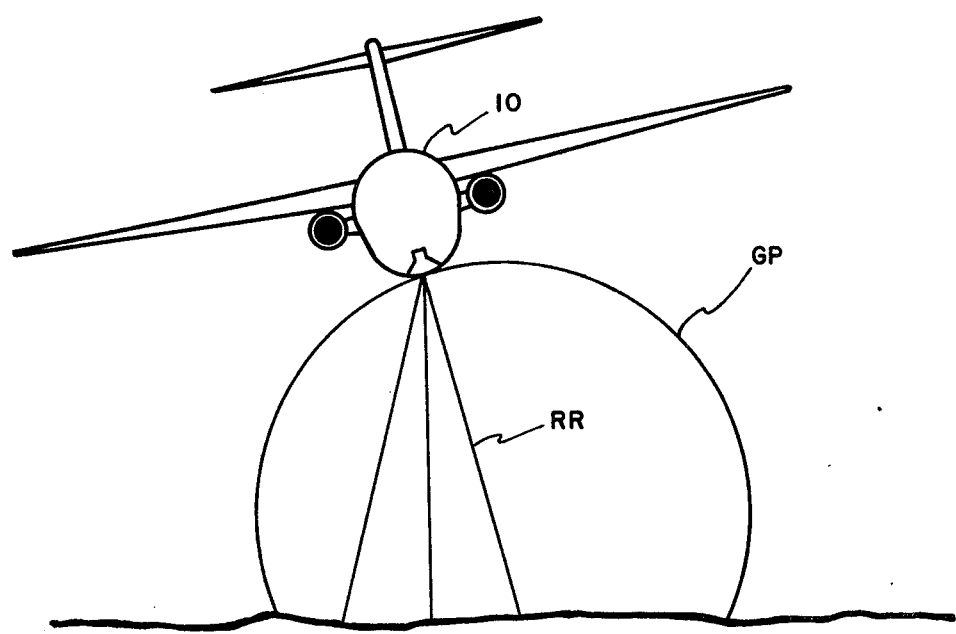
FIG. 10 is a schematic diagram used in connection with the explanation of the manner in which the system of the present invention is essentially insensitive to varitions in vehicle roll attitude.

FIG. 10 illustrates the reason why the system of the present invention is essentially insensitive to variations of roll attitude of the aircraft. Because of the broad beam characteristics of the antennas used, as indicated by the gain pattern designation GP, the portion of the reflection radiation utilized by the receiving and processing circuits, which is designated by the conical pattern RR (also see the previous discussion provided in connection with FIG. 2a), remains the same over a wide range of aircraft roll positions whereupon roll maneuvering does not effect the operation of the system.

Figure 11:
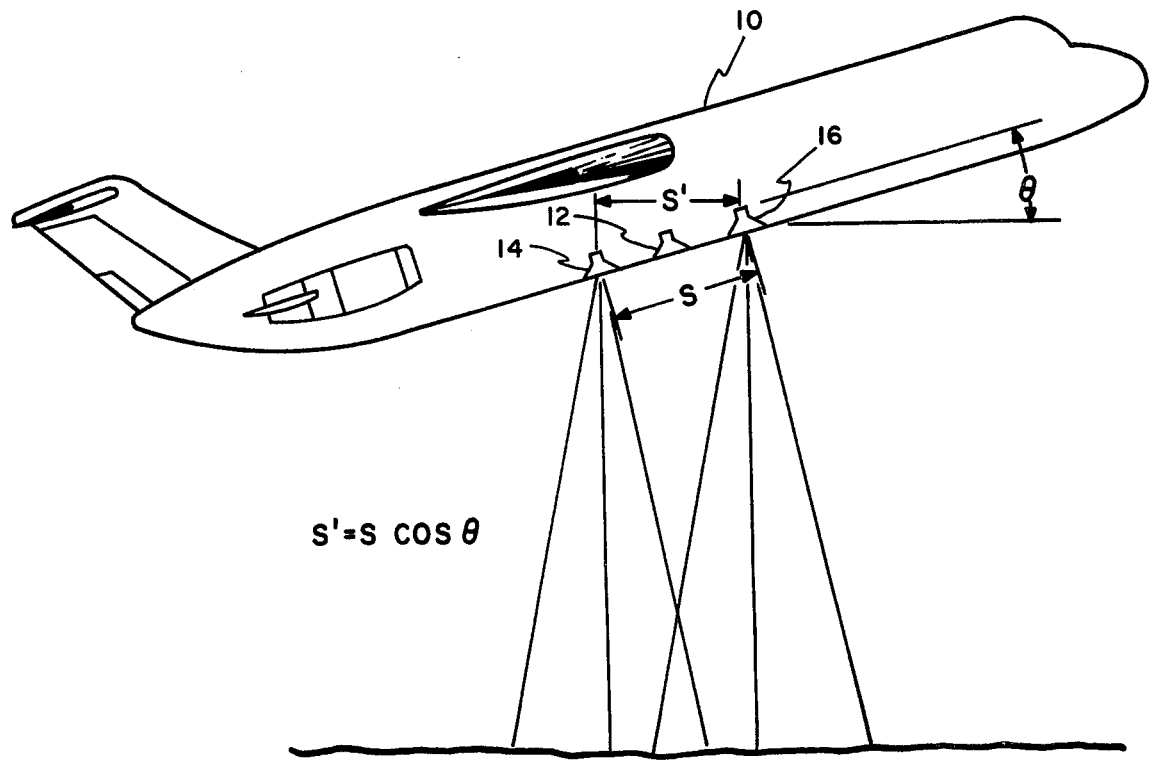
FIG. 11 is a schematic diagram used in connection with the explanation of the manner in which the system of the invention is essentially insensitive to variations in vehicle pitch attitude.

The system is also essentially insensitive to variations of aircraft pitch attitude. As shown in FIG. 11, the aircraft pitch angle theta alters the effective longitudinal spacing between the forward and aft antennas 16 and 14, respectively, from the distance S to the distance S'. S' is equal to S cos 0. Therefore, the value computed for heading velocity $V_H$ must be factored by the cosine of the pitch angle. This can be done simply by providing an input to the CPU 180 (FIG. 7b) or the computing circuit 60 (FIG. 3) from a conventional pitch sensor whereupon the computing circuits apply the appropriate cosine compensation factor. As previously discussed, the system of the invention operates on the basis of non-coherent detection of the reflected signals and thus does not rely to any significant extent on the phase content thereof. Therefore, since aircraft pitch changes affect only the relative propagation distances and do not alter the angular relationships of the transmitted and reflected pulses (as previously described in connection with FIG. 1), operation of the system is unaffected thereby. That is, a pulse received at forward antenna 16 travels a greater distance than a pulse received by aft antenna 14 because the latter is closer to the ground. The phase changes introduced by the different path lengths do not alter the time-amplitude characteristics of the echo pulses to a degree which affects operation of the system.

It is thus seen that the embodiment of the invention shown in FIGS. 7a and 7b employs transmitting means, receiving means and correlating means and operates to measure and track the aircraft drift angle. As embodied in FIG. 7, the receiving means comprises the antennas 102 and 104, the signal-combining network including hybrids 122, 124 and 130 and further includes the signal switching and detecting elements 224, 126, 128, 132, 134, 138, 140, 142, 144 and 146. The system further includes correlating means comprising the signal sampling and converting circuits 156, 162, the signal storage and transfer circuits 168 and 170 and the CPU circuits 180. The correlating means operate to generate the crosscorrelation outputs, the crosscorrelation difference output and offset control signal K. Offset means comprising converter 228, D/A circuit 172 and decoder 174 are provided for intermittantly shifting the forward and aft phase centers in directions lateral to the heading direction.

Further, control means responsive to the K signal provided by the CPU 180 are provided for controlling the offset means to alter the amount of lateral phase center displacement so as to minimize the crosscorrelation difference output. As embodied in the FIG. 7 system, the control means comprises the K register 186, adder 200, I generator 194 and associated circuits 196 and 226.

Finally, the system includes calculating means for determining the drift angle in response to the amount of phase center displacement. Additionally, the system may include means for measuring and tracking aircraft heading velocity and the calculating means in such a system is modified to determine drift velocity as a function of the heading velocity and drift angle.

It will be appreciated that various changes in the form and details of the above-described embodiments may be effected by persons of ordinary skill without departing from the true spirit and scope of the invention.

What is claimed is:

1. A system for determining the drift angle of a fluid-born vehicle, said drift angle being defined as the angle between the vehicle heading direction and the direction said vehicle is moving relative to an adjacent stationary reflecting surface, said system comprising, in combination:

transmitting means provided on said vehicle for illuminating said surface with a train of wave energy pulses;

receiving means on said vehicle for receiving said wave energy after reflection from said surface, said receiving means having forward and aft energy-receiving phase centers spaced apart from one another in said vehicle heading direction;

offset means for electronically intermittantly shifting said forward and aft phase centers by selected amounts in directions lateral to said heading direction;

correlating means responsive to reflected wave energy pulses received at said forward and aft phase centers for processing selected pairs of said forward and aft received pulses to generate a crosscorrelation output indicative of the crosscorrelation of a plurality of said selected pairs, said correlating means further operating to generate a crosscorrelation difference output indicative of the difference between crosscorrelation outputs generated for different lateral positions of said phase centers and to generate an offset control signal in response to said crosscorrelation difference output, and wherein said correlating means includes means for sampling the amplitude of each of said received pulses and for storing an amplitude value F for each said forward pulse and an amplitude value A for each said aft pulse; and crosscorrelation output means for generating said crosscorrelation outputs in accordance with the algorithm $$\rho FA = \frac{E\{FA\} - \eta_F \eta_A}{\sigma_F \sigma_A}$$

where $E\{FA\}$ represents the expected value of the products of said amplitude values for a predetermined number of said selected pairs of pulses; $\eta_F \eta_A$ represents the product of the mean values for the F and A values, respectively, in said predetermined number of selected pairs of pulses and $\sigma_F \sigma_A$ represents the product of the standard deviation values for the F and A values, respectively, in said predetermined number of selected pairs of pulses;

electronic control means responsive to said offset control signal for controlling said offset means to alter the amount of lateral displacement of said phase centers so as to minimize said crosscorrelation difference output; and calculating means responsive to the amount of said phase center displacement for generating a representation of drift angle.

2. The system set forth in claim 1 wherein each said selected pair of forward and aft pulses comprises a different aft-received pulse together with the forward-received pulse which was received N pulse repetition intervals earlier in time.

3. A system for determining the drift angle of a fluid-born vehicle, said drift angle being defined as the angle between the vehicle heading direction and the direction said vehicle is moving relative to an adjacent stationary reflecting surface, said system comprising, in combination:

transmitting means provided on said vehicle for illuminating said surface with a train of wave energy pulses;

receiving means on said vehicle for receiving said wave energy after reflection from said surface, said receiving means having forward and aft energy-receiving phase centers spaced apart from one another in said vehicle heading direction;

offset means for electronically intermittantly shifting said forward and aft phase centers by selected amounts in directions lateral to said heading direction;

correlating means responsive to reflected wave energy pulses received at said forward and aft pulse centers for processing selected pairs of said forward and aft received pulses to generate a crosscorrelation output indicative of the crosscorrelation of a plurality of said selected pairs, said correlating means further operating to generate a crosscorrelation difference output indicative of the difference between crosscorrelation outputs generated for different lateral positions of said phase centers and to generate an offset control signal in response to said crosscorrelation difference outputs;

electronic control means responsive to said offset control signal for controlling said offset means to alter the amount of lateral displacement of said phase centers so as to minimize said crosscorrelation difference output;

calculating means responsive to the amount of said phase center displacement for generating a representation of drift angle;

wherein said correlating means further includes means for generating a correlation output $e_{vi}$ in accordance with the algorithm $$e_{vi} = \tfrac{1}{2}[(A_{N+i} - F_i)F_{i-2} - F_{i+2}) + (A_{N+i+2} - F_{i+2})(F_i - F_{i+4})]$$

where $A_{N+i}$ and $A_{N+i+2}$ represent two consecutively received aft pulses, $F_i$ and $F_{i+2}$ represent the forward pulses received immediately before and after said $F_i$ pulse and $F_i$ and $F_{i+4}$ represent the forward pulses received immediately before and after said $F_{i+2}$ pulse, the subscript $i$ denoting a progression of alternate odd integers to indicate the chronological occurrence of said pulses and the subscript N denoting that each aft pulse of said pair is received N pulse repetition intervals later in time than its associated forward pulse;

means responsive to said correlation output for controlling said transmitting means to adjust the repetition frequency of said train of wave energy pulses such that said correlation output is maintained at a minimum value; and means for determining said heading velocity based on the quotient of said phase center separation distance and N multiplied by the duration of the interval between pulses in said transmitted pulse train, and wherein said calculating means includes means responsive to said representations of heading velocity and drift angle for generating a representation of the drift velocity of said vehicle.

4. A system for determining the drift angle of an aircraft relative to the ground, said drift angle being defined as the angle between the vehicle heading direction and the direction said vehicle is moving relative to an adjacent stationary reflecting surface, said system compromising, in combination:

transmitting means provided on said aircraft for illuminating said surface with a train of rf pulses;

receiving means on said aircraft for receiving said rf pulses after reflection from said surface, said receiving means having forward and aft energy-receiving phase centers spaced apart from one another in said vehicle heading direction, wherein said receiving means further comprises a pair of forward antennas spaced apart from one another in said lateral direction; a pair of aft antennas spaced apart from one another in said lateral direction; and hybrid waveguide means for combining the rf energy received at said respective pairs of antennas such that said forward phase center is located on a phase center line joining the phase centers of said pair of forward antennas and said aft phase center is located on a phase center line joining the phase centers of said aft antennas;

offset means for electronically intermittantly shifting said forward and aft phase centers by selected amounts in directions lateral to said heading direction;

correlating means responsive to reflected rf pulses received at said forward and aft phase centers for processing selected pairs of said forward and aft received pulses to generate a crosscorrelation output indicative of the crosscorrelation of a plurality of said selected pairs, said correlating means further operating to generate a crosscorrelation difference output indicative of the difference between crosscorrelation outputs generated for different lateral positions of said phase centers and to generate an offset control signal in response to said crosscorrelation difference output;

electronic control means responsive to said offset control signal for controlling said offset means to alter the amount of lateral displacement of said phase centers so as to minimize said crosscorrelation difference output; and calculating means responsive to the amount of said phase center displacement for calculating said drift angle.

5. The system set forth in claim 4 wherein said hybrid waveguide means comprises:

a first hybrid having input ports connected to receive the signals from said forward pair of antennas and having sum and difference output ports;

a second hybrid having input ports connected to receive the signals from said aft pair of antennas and having sum and difference output ports;

a third hybrid having a pair of input ports and a sum and difference output port;

means for alternately coupling the input ports of said third hybrid to the output ports of said first and second hybrids; and variable signal attenuation means provided at one of the inputs to said third hybrid whereupon control of said attenuation means causes the signals presented at the output ports of said third hybrid to emanate from selected phase centers located on either of said forward of aft phase center lines.

6. The system set forth in claim 5 further comprising:

polarity selection means coupled to said third hybrid output ports and having an output line, said selection means being operable to couple one or the other of said third hybrid output ports to said output line whereby the signal on said output line is controlled to emanate from a single phase center on either said forward or said aft phase center line.

7. The system set forth in claim 5 wherein said offset means comprises:

means for generating an attenuation control signal;

means for coupling said control signal to said variable attenuation means to cause the signals produced at said third hybrid output ports to emanate from selected locations on said phase center lines; and means for periodically changing said control signal to effect said intermittant shifting of said phase center locations between predetermined locations on said phase center locations between predetermined locations on said phase center lines.

8. The system set forth in claim 6 wherein said offset means comprises:

means for generating a polarity selection control signal;

means for coupling said attenuation and polarity selection control signals to said variable attenuation means and said polarity selection means, respectively, to cause the signal presented on said output line to emanate from a single predetermined location on each of said phase center lines; and means for periodically changing said control signals to effect said intermittant shifting of said phase center locations between multiple predetermined locations on said phase center lines.

* * * * *